(12) United States Patent
Smith et al.

(10) Patent No.: US 10,909,868 B2
(45) Date of Patent: Feb. 2, 2021

(54) GUIDING CREATION OF AN ELECTRONIC SURVEY

(71) Applicant: QUALTRICS, LLC, Provo, UT (US)

(72) Inventors: Jared Smith, Provo, UT (US); Milind Kopikare, Draper, UT (US); Daryl R Pinkal, American Fork, UT (US); Oliver M Hall, Provo, UT (US); Daan Lindhout, Seattle, WA (US)

(73) Assignee: QUALTRICS, LLC, Provo, UT (US)

( * ) Notice: Subject to any disclaimer, the term of this patent is extended or adjusted under 35 U.S.C. 154(b) by 0 days.

(21) Appl. No.: 16/921,631

(22) Filed: Jul. 6, 2020

(65) Prior Publication Data
US 2020/0335002 A1 Oct. 22, 2020

Related U.S. Application Data

(63) Continuation of application No. 15/339,169, filed on Oct. 31, 2016, now Pat. No. 10,706,735.

(51) Int. Cl.
*G09B 7/00* (2006.01)
*G09B 7/06* (2006.01)
*G09B 7/02* (2006.01)
*G06F 40/174* (2020.01)

(52) U.S. Cl.
CPC .............. *G09B 7/00* (2013.01); *G09B 7/02* (2013.01); *G09B 7/06* (2013.01); *G06F 40/174* (2020.01)

(58) Field of Classification Search
CPC ... G09B 7/00; G09B 7/02; G09B 7/06; G06Q 30/0203
See application file for complete search history.

(56) References Cited

U.S. PATENT DOCUMENTS

| | | |
|---|---|---|
| 6,189,029 B1 | 2/2001 | Fuerst |
| 7,103,835 B1 | 9/2006 | Yankovich et al. |
| 7,698,339 B2 | 4/2010 | Zhang et al. |
| 7,991,916 B2 | 8/2011 | Meek et al. |
| 8,051,145 B2 | 11/2011 | Wu et al. |
| 8,229,915 B1 | 7/2012 | Lloyd et al. |
| 8,239,755 B2 | 8/2012 | Maguire |

(Continued)

OTHER PUBLICATIONS

Emmet LiveStyle: installation and usage, Jul. 25, 2013, pp. 1-3, https://github.com/sergeche/livestyle/blob/master/INSTALLATION.md.

(Continued)

*Primary Examiner* — James S. McClellan
(74) *Attorney, Agent, or Firm* — Keller Jolley Preece

(57) ABSTRACT

This disclosure generally covers systems and methods that provide guidance to create an electronic survey. In some embodiments, the systems and methods identify and provide a suggested survey topic—with a corresponding option to create an electronic survey—based on user input. In some embodiments, the systems and methods identify and provide one or more suggested electronic survey questions based on user input. In such embodiments, the systems and methods provide, for example, components of suggested electronic survey questions, previously composed and benchmarking electronic survey questions, or suggested revisions to electronic survey questions. In addition, the systems and methods can provide entire premade electronic surveys based on receiving user input from a survey administrator.

20 Claims, 17 Drawing Sheets

(56) References Cited

U.S. PATENT DOCUMENTS

| | | |
|---|---|---|
| 8,745,075 B2 | 6/2014 | Gaucas et al. |
| 8,868,570 B1 | 10/2014 | Skut et al. |
| 8,996,985 B1 | 3/2015 | Johnston et al. |
| 9,069,768 B1 | 6/2015 | Sampson |
| 9,119,156 B2 | 8/2015 | Green et al. |
| 9,524,277 B2 | 12/2016 | Nekkalapudi |
| 9,584,629 B2 | 2/2017 | Lerman |
| 10,049,085 B2 | 8/2018 | Williams et al. |
| 2002/0138528 A1 | 9/2002 | Gong et al. |
| 2003/0023641 A1 | 1/2003 | Gorman et al. |
| 2003/0023953 A1 | 1/2003 | Lucassen et al. |
| 2003/0056100 A1 | 3/2003 | Beatson |
| 2003/0101235 A1 | 5/2003 | Zhang |
| 2003/0222910 A1 | 12/2003 | Guerrero |
| 2006/0122889 A1 | 6/2006 | Burdick et al. |
| 2006/0156216 A1 | 7/2006 | Chen et al. |
| 2006/0282415 A1 | 12/2006 | Shibata et al. |
| 2007/0208703 A1 | 9/2007 | Shi et al. |
| 2007/0260475 A1 | 11/2007 | Bhanote |
| 2007/0296805 A1 | 12/2007 | Tedenvall et al. |
| 2008/0109715 A1 | 5/2008 | Stover |
| 2009/0138798 A1 | 5/2009 | Fan et al. |
| 2009/0187593 A1 | 7/2009 | Chen et al. |
| 2009/0215478 A1 | 8/2009 | Leinonen et al. |
| 2009/0249216 A1 | 10/2009 | Charka et al. |
| 2010/0017704 A1 | 1/2010 | Jaffe et al. |
| 2010/0161378 A1 | 6/2010 | Josifovski et al. |
| 2010/0180192 A1 | 7/2010 | Hall |
| 2010/0226564 A1 | 9/2010 | Marchesotti et al. |
| 2010/0293598 A1 | 11/2010 | Collart et al. |
| 2011/0054960 A1 | 3/2011 | Bhatia et al. |
| 2011/0173589 A1 | 7/2011 | Guttman et al. |
| 2011/0231226 A1 | 9/2011 | Golden |
| 2012/0042102 A1 | 2/2012 | Chung et al. |
| 2012/0089659 A1 | 4/2012 | Halevi et al. |
| 2012/0203861 A1 | 8/2012 | Flack et al. |
| 2012/0311140 A1 | 12/2012 | Kuroda et al. |
| 2013/0014153 A1 | 1/2013 | Bhatia et al. |
| 2013/0132817 A1 | 5/2013 | Sharad et al. |
| 2013/0174012 A1 | 7/2013 | Kwan et al. |
| 2013/0187926 A1 | 7/2013 | Silverstein et al. |
| 2013/0326333 A1 | 12/2013 | Hashmi |
| 2013/0326337 A1 | 12/2013 | Lehmann et al. |
| 2013/0326406 A1 | 12/2013 | Reiley et al. |
| 2014/0012676 A1 | 1/2014 | Forte |
| 2014/0079297 A1 | 3/2014 | Tadayon et al. |
| 2014/0214535 A1 | 7/2014 | Kee et al. |
| 2014/0258830 A1 | 9/2014 | Gormish |
| 2014/0351268 A1 | 11/2014 | Weskamp et al. |
| 2015/0012812 A1 | 1/2015 | Wu et al. |
| 2015/0033310 A1 | 1/2015 | Chen et al. |
| 2015/0035959 A1 | 2/2015 | Amble et al. |
| 2015/0154660 A1 | 6/2015 | Weald et al. |
| 2015/0193794 A1 | 7/2015 | Douglas et al. |
| 2015/0243181 A1* | 8/2015 | Somasundaran ........ G09B 7/02 434/167 |
| 2015/0248676 A1 | 9/2015 | Vaidyanathan et al. |
| 2015/0334121 A1 | 11/2015 | Hernberg |
| 2016/0044071 A1 | 2/2016 | Sandholm |
| 2016/0103800 A1 | 4/2016 | Girault et al. |
| 2016/0212178 A1 | 7/2016 | Zhang et al. |
| 2016/0266881 A1 | 9/2016 | Thompson et al. |
| 2016/0364201 A1 | 12/2016 | Beveridge et al. |
| 2018/0089412 A1 | 3/2018 | Kopikare et al. |
| 2018/0122256 A1 | 5/2018 | Smith et al. |
| 2018/0341626 A1 | 11/2018 | Williams et al. |

OTHER PUBLICATIONS

Html5rocks.com, "Synchronized Cross-device Mobile Testing", Jan. 4, 2014, pp. 1-25 https://www.html5rocks.com/en/tutorials/tooling/synchronized-cross-device-testing/.

Smashingmagazine.com,"Review of Cross-Browser Testing Tools" published Aug. 7, 2011 and as available on Jul. 27, 2015, pp. 1-13 http://www.smashingmagazine.com:80/2011/08/a-dozen-cross-browser-testing-tools/.

Surveygizmo.com how to create accessible online form, Nov. 13, 2013, pp. 1-10, https://www.surveygizmo.com/survey-blog/creating-accessible-online-forms-everyone-benefits-from-a-well-designed-web-form/.

Survey Monkey online survey generator, 1999 as evidenced by youtube video available online at https://www.youtube.com/watch?v =OLK5a4y0Lmo, published Dec. 12, 2015).

U.S. Appl. No. 14/841,357, Jun. 23, 2017, Office Action.
U.S. Appl. No. 14/841,357, Dec. 1, 2017, Office Action.
U.S. Appl. No. 14/841,357, Apr. 12, 2018, Notice of Allowance.
U.S. Appl. No. 15/339,169, Jun. 4, 2018, Office Action.
U.S. Appl. No. 15/339,169, Feb. 15, 2019, Office Action.
U.S. Appl. No. 15/339,169, Oct. 18, 2019, Office Action.
U.S. Appl. No. 15/339,169, Mar. 12, 2020, Notice of Allowance.
U.S. Appl. No. 15/274,786, Jan. 11, 2018, Office Action.
U.S. Appl. No. 15/274,786, Jun. 28, 2018, Office Action.
U.S. Appl. No. 15/274,786, Jan. 28, 2019, Office Action.
U.S. Appl. No. 15/274,786, Aug. 8, 2019, Notice of Allowance.
U.S. Appl. No. 16/050,908, Oct. 19, 2018, Office Action.
U.S. Appl. No. 16/050,908, Feb. 4, 2019, Office Action.
U.S. Appl. No. 16/050,908, May 23, 2019, Notice of Allowance.
U.S. Appl. No. 16/588,774, dated Sep. 2, 2020, Office Action.
U.S. Appl. No. 16/730,521, dated Sep. 25, 2020, Office Action.

* cited by examiner

GUIDING CREATION OF AN ELECTRONIC SURVEY

CROSS-REFERENCE TO RELATED APPLICATIONS

The present application is a continuation of U.S. application Ser. No. 15/339,169, filed on Oct. 31, 2016. The aforementioned application is hereby incorporated by reference in its entirety.

BACKGROUND

Companies, research institutions, and other organizations increasingly create and distribute electronic surveys to gather information about target populations, services, products, and other interests. The use of electronic surveys continues to gain popularity in part because potential survey respondents increasingly have access to personal computers, mobile devices, and other computing devices that facilitate receiving and responding to electronic surveys over a communication network. To capitalize on the increased access to electronic surveys, some organizations engage outside firms with survey methodologists who create and distribute electronic surveys, such as surveys designed to apply a certain survey methodology. Moreover, many organizations increasingly use electronic survey systems to create, distribute, and manage electronic surveys for the organization, rather than rely on outside firms, such as survey methodologists.

While electronic surveys have facilitated the ease at which organizations can gather and use electronic survey information, standard setting organizations, government laws or regulations, and strategists increasingly request information from various target populations. For instance, laws and regulations often request the same or similar data from many different organizations. Consequently, to comply with various industry or governmental standards, organizations often need to obtain the same or similar information from a target population based on a particular standard. Accordingly, many organizations continue to increase their reliance on electronic surveys to collect information to meet various industry or government standards.

Unfortunately, conventional electronic survey systems have several disadvantages related to allowing organizations to create and distribute an electronic survey. For example, conventional electronic survey systems fail to account for the fact that many organizations lack experience in generating and distributing an effective electronic survey. In particular, conventional electronic survey systems often rely on a user within an organization to choose and generate a question type and answer format, question content, and answer content for each question within an electronic survey. Accordingly, based on conventional electronic survey systems relying on an inexperienced user to format and provide electronic survey question content, many conventional electronic survey systems ultimately provide an electronic survey that does not meet a desired industry or government standard.

Moreover, even in the event that an electronic survey does not incorporate industry or government standards, conventional electronic survey systems often result in inexperienced users creating electronic surveys that generate unreliable or incorrect survey response data. For example, based on conventional electronic survey systems requiring a user to generate survey question content, many users provide a question format or question wording that is confusing or ambiguous, which in turn generates unreliable survey response data. Worse yet is that many organizations make important strategic decisions based on survey response data. Thus, conventional electronic survey systems often result in an organization using unreliable, incomplete, or even incorrect survey response data to make strategic decisions.

Accordingly, these and other disadvantages decrease the utility and reliability of conventional systems and methods for providing electronic surveys.

SUMMARY

This disclosure describes solutions to some or all of the foregoing problems with various embodiments of systems and methods for creating an electronic survey. In particular, in some embodiments, the systems and methods guide a survey administrator through a process of creating an electronic survey to include reliable electronic survey questions for a particular use. For example, in one or more embodiments, the systems and methods suggest electronic survey topics, electronic survey questions, and/or entire electronic surveys based on input from a survey administrator, such as an input indicating an industry, selected topic, or a purpose. For instance, based on the survey administrator's input, the systems and methods provide a suggested electronic survey question designed for a particular use. Accordingly, the systems and methods allow survey administrators of all experience levels to easily and efficiently create electronic surveys that reliably meet a particular standard (e.g., industry or government standard) and/or provide reliable survey response data (e.g., reliable customer feedback data).

Certain embodiments of the systems and methods request, collect, and/or otherwise identify information that may indicate a purpose of the electronic survey (e.g., profile information, industry information, or survey topics). Based on the identified information, some embodiments of the systems and methods provide a suggested electronic survey question based on an indicated purpose of the electronic survey. Moreover, in other example embodiments, the systems and methods can provide multiple electronic survey questions designed for an indicated purpose. Accordingly, the systems and methods guide a user in creating an electronic survey that includes questions that have historically elicited survey response data that a survey administrator desires for a particular purpose.

In some embodiments, the systems and methods provide a pre-created electronic survey including various suggested electronic survey questions based on user input that indicates a particular survey purpose. For example, in one or more embodiments, the systems and methods identify and provide content for an entire electronic survey (e.g., a pre-created electronic survey). For instance, based on receiving user input that indicates a purpose of the electronic survey is to comply with a particular government standard, the systems and methods provide a pre-created electronic survey that meets or exceeds the particular standard. In addition, the systems and methods can incorporate one or more components of the user input into the pre-created electronic survey to provide a customized electronic survey that meets the particular standard.

In addition to providing a pre-created electronic survey, in some embodiments, the systems and methods determine a suggested electronic survey question by analyzing and selecting previously composed electronic survey questions that correspond with an identified purpose. For instance, the systems and methods can access a database of previously composed electronic survey questions related to a particular purpose (e.g., questions that one or more organizations previously used in an electronic survey), determine which of the previously composed electronic survey questions were most effective, and provide a suggested electronic survey question based on the content of a previously composed electronic survey question. Accordingly, the systems and methods, in essence, generate suggested electronic survey questions based on identifying the most useful questions related to a particular purpose within the collective experience of an electronic survey system.

Accordingly, the various embodiments of the systems and methods allow survey administrators of all experience levels to create effective electronic surveys that meet a particular standard or follows a best practice. Additionally, one or more embodiments provide a guided electronic survey creation process that results in an electronic survey that generates reliable survey response data without the need to engage an outside firm of survey methodologists, thus reducing the time and cost of creating an effective electronic survey. Indeed, the systems and methods allow a survey administrator to create an electronic survey faster and more efficiently than conventional electronic survey systems. Accordingly, by providing a guided electronic survey creation process, the systems and methods require relatively lower costs and time to create electronic surveys, decrease survey administrator mistakes, and/or increase the effectiveness of survey questions by ensuring electronic survey questions will generate reliable survey response data.

The following description sets forth additional features and advantages of the present invention. Some of these additional features and advantages will be obvious from the description or may be learned by the practice of such embodiments. A person of ordinary skill in the art may realize and obtain the features and advantages of these embodiments through the systems and methods particularly pointed out in the appended claims.

BRIEF DESCRIPTION OF THE DRAWINGS

Below is a brief description of the figures this disclosure references.

DETAILED DESCRIPTION

Figure 1:
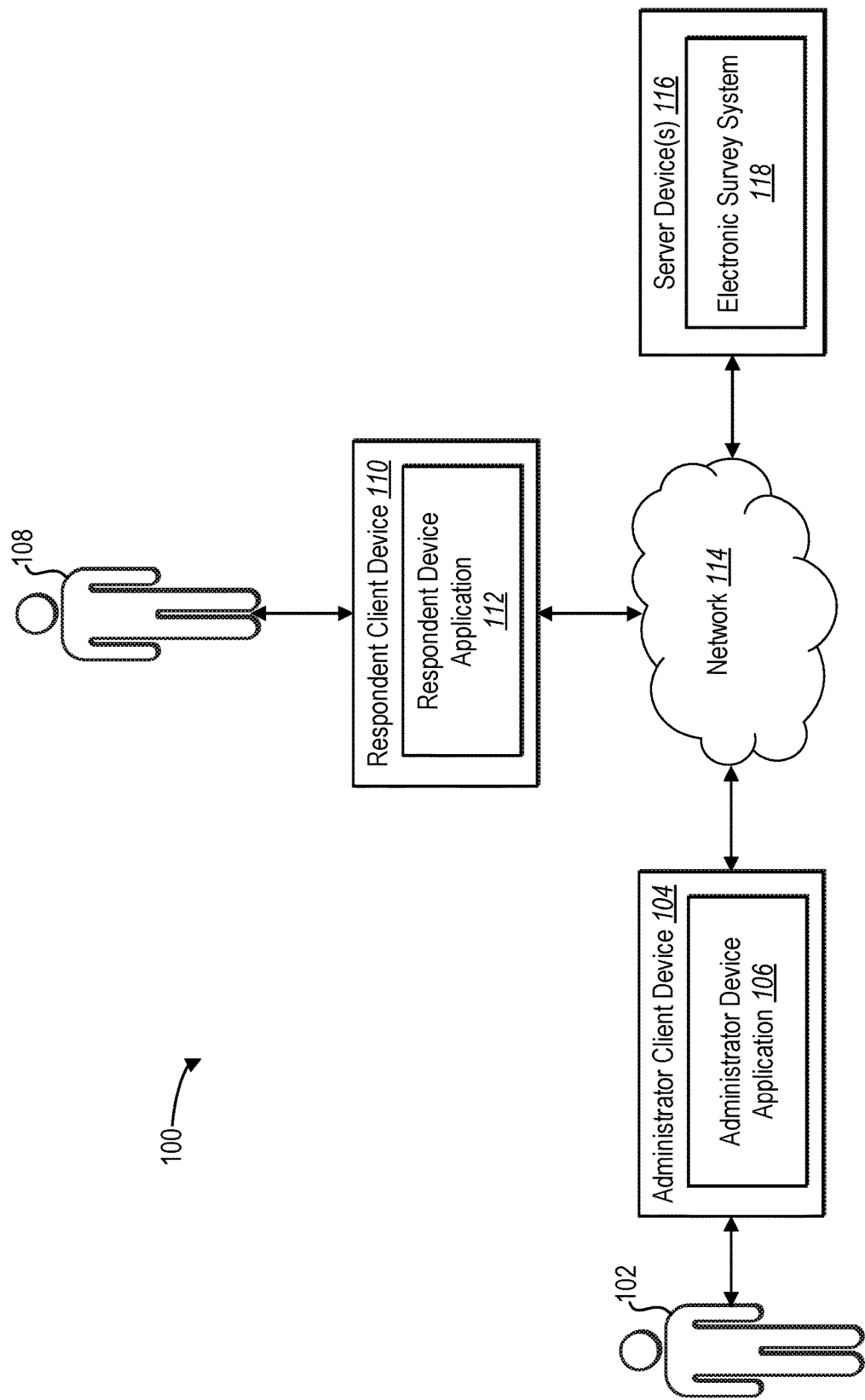
FIG. 1 illustrates a block diagram of a communication system in accordance with one or more embodiments.

This disclosure describes one or more embodiments of an electronic survey system that reacts to input from a survey administrator to provide the survey administrator guidance to create an effective electronic survey. For example, in some embodiments, the electronic survey system receives input from a survey administrator and, based on the input, the electronic survey system provides guidance (e.g., question suggestions or other electronic survey options) for creating an electronic survey. In one or more embodiments, for example, the electronic survey system provides a customized electronic survey based on input from the survey administrator (e.g., an indication to create a survey that satisfies a government regulation, satisfies an industry best practice, or collects a particular type of customer feedback). Additionally, and as part of providing guidance to create an effective electronic survey, the electronic survey system can provide a suggested electronic survey question that satisfies a particular standard, elicited reliable survey data, or met a purpose identified by a survey administrator.

For example, in some embodiments, the electronic survey system provides specific suggestions to create an electronic survey based on a survey administrator's input. In some embodiments, for instance, the electronic survey system receives input from a survey administrator that indicates a particular topic (e.g., a particular government regulation, a particular industry, or a particular survey type, such as a customer feedback survey). In addition, and based on the particular topic, the electronic survey system identifies and provides one or more suggested electronic survey questions for presentation to the survey administrator as a guided suggestion. Moreover, the electronic survey system further creates an electronic survey using the one or more suggested electronic survey questions for distribution to one or more respondent client devices (e.g., based on a survey administrator accepting the one or more suggested electronic survey questions).

Some embodiments of the electronic survey system provide a guided process that efficiently creates customized electronic surveys for distribution to one or more respondent client devices. In one or more embodiments, for instance, the electronic survey system provides various selectable options that allow a survey administrator to indicate a topic (e.g., purpose) of an electronic survey. Then, as mentioned above, the electronic survey system can generate one or more suggested electronic survey questions that the survey administrator can quickly review and easily incorporate within an electronic survey. Accordingly, the electronic survey system can efficiently guide the survey administrator (e.g., using the one or more suggested electronic survey questions) to create an electronic survey without the survey administrator needing to provide content input on a question-by-question basis. For example, various embodiments of the electronic survey system provide premade electronic survey questions, or entire premade electronic surveys, to a survey administrator within a guided streamlined process to create and distribute an electronic survey.

Additionally, various example embodiments of the electronic survey system analyze electronic survey questions that a survey administrator composes to provide guidance to the survey administrator in creating an improved, or more effective, electronic survey question. For instance, in one or more embodiments, the electronic survey system analyzes a draft electronic survey question composed by a survey administrator to determine one or more characteristics of the draft electronic survey question (e.g., question type, question topic, question purpose). For example, based on identifying one or more characteristics of a draft electronic survey question, the electronic survey system can provide suggested question content for the draft survey question, suggested content revisions to the draft survey question, suggested question settings changes, and/or one or more additional electronic survey questions that relate to the draft survey question.

In one or more embodiments, for instance, the electronic survey system can identify and provide a suggested electronic survey question based on a previously composed and/or previously administered survey question that is known to effectively accomplish the purpose of a draft electronic survey question composed by the survey administrator. For instance, based on one or more characteristics of a draft electronic survey question, the electronic survey system can access previously composed electronic survey questions (e.g., electronic survey questions used within a previously administered electronic survey) to determine one or more previously composed electronic survey questions to suggest to the survey administrator. In some embodiments, the electronic survey system analyzes the previously composed electronic survey questions in light of various factors to identify the most effective electronic survey questions to suggest (e.g., an electronic survey question that indicates a previous effectiveness and producing reliable response data based on a usage history).

Furthermore, the electronic survey system can identify and provide a suggested electronic survey question that can be used as a benchmarking question. For example, the electronic survey system can determine that a survey administrator has composed a question that relates to a benchmark question used within an industry related to the electronic survey that a survey administrator is composing. Accordingly, the electronic survey system can provide the benchmarking question for presentation to the survey administrator with an explanation of the benefits of choosing to use a benchmarking question (e.g., comparing results with an industry standard). Accordingly, the electronic survey system guides a survey administrator in quickly creating an electronic survey that includes one or more benchmarking questions that allows the survey administrator to compare response results to an industry benchmark for the exact same question.

In addition to providing one or more suggested electronic survey questions, in some embodiments, the electronic survey system detects characteristics of a draft electronic survey question to provide a suggested revision. In particular, based on characteristics of a draft electronic survey question, the electronic survey system can detect one or more indications of an ineffective electronic survey question within a draft electronic question. For example, the electronic survey system can analyze a draft electronic survey question to detect a language error, a confusing question construction (e.g., a double negative), an incorrect question type, and/or other indications of an ineffective question. Accordingly, and based on a detecting an indication of an ineffective electronic survey question, the electronic survey system provides one or more suggested revisions to remedy and improve the quality and effectiveness of the draft electronic survey question.

As part of guiding a survey administrator in creating an effective electronic survey, various embodiments of the electronic survey system can generate and provide for presentation a survey response report preview corresponding to an electronic survey question. For example, often a survey administrator may not understand the nature of the response data that will result from a particular electronic survey question. Therefore, to guide a survey administrator in creating an electronic survey question that will generate useful response data, the electronic survey system can generate a survey response report preview by generating sample response data to a particular question or by accessing response data from a previous administration of a survey question.

As will be described in more detail below, and in addition to the above-described features and benefits, one or more embodiments of the electronic survey system improve the function of various computer devices operating within the electronic survey system. For example, by limiting ineffective survey questions based on various guided survey creation solutions, the electronic survey system dramatically decreases computing resource requirements compared to conventional systems by reducing the amount of computer storage needed by minimizing the amount of ineffective electronic survey questions within the system. In addition, the electronic survey system reduces the amount of communication network bandwidth compared to conventional systems based on administering fewer electronic survey questions due to limiting the number of ineffective survey questions that have to be re-administered.

Moreover, and as briefly discussed above, some embodiments of the electronic survey system access premade electronic surveys and/or previously composed electronic survey questions to include within a new electronic survey. In such instances, the electronic survey system can include one or more premade or previously composed electronic survey questions in a new electronic survey by pointing to (e.g., linking) a premade or previously composed electronic survey question. In other words, the electronic survey system can in essence store a single instance of an electronic survey (or electronic survey question) used within a vast number of electronic surveys. Accordingly, one or more embodiments of the electronic survey system reduce the storage required to create and store electronic surveys compared to conventional systems.

This disclosure uses several terms with the following definitions. The term electronic survey refers to an electronic communication that includes one or more electronic survey questions. The term "electronic survey question" refers to a prompt within an electronic communication that invokes a response from a respondent. Example types of electronic survey questions include, but are not limited to, multiple choice, open-ended, ranking, scoring, summation, demographic, dichotomous, differential, cumulative, dropdown, matrix, net promoter score (NPS), single textbox, heat map, and any other type of prompt that can invoke a response from a respondent. An electronic survey question can refer to a request portion and/or response portion. For example, when describing a multiple choice survey question, the term electronic survey question may refer to one or both of the question portion and/or the multiple choice answers associated with the multiple-choice question. An electronic survey may be in any format and need not include a question. For example, an electronic survey question may comprise a command to draw a digital signature, capture an image, or simply provide information.

The term "electronic survey template" refers to an electronic space (e.g., a document or file) in which a user composes, formats, edits, and/or otherwise creates one or more electronic survey questions. In some embodiments, the electronic survey template can be represented in a graphical user interface as a graphical space (e.g., a question block) in which a user creates an electronic survey question by selecting options, inputting data (e.g., text), and associating rules and/or other features with an electronic survey question. In other embodiments, an electronic survey template comprises a number of graphical spaces (e.g., multiple question blocks) in which a user creates a corresponding number of electronic survey questions (e.g., each graphical space represents a separate electronic survey question).

The term "survey administrator" refers to a user of the electronic survey system who creates, selects, modifies, edits, or chooses options for an electronic survey. For example, in some embodiments, the survey administrator uses an administrator client device to select options within an electronic survey template to create, select, modify, or edit an electronic survey. Additionally, in some embodiments, a survey administrator may select options to distribute an electronic survey.

Turning now to the figures, FIG. 1 illustrates a block diagram of an embodiment of a communication system 100 (or simply "system 100"). In general, and as illustrated in FIG. 1, the system 100 includes an administrator client device 104, including an administrator device application 106. As shown in FIG. 1, the administrator client device 104 is associated with a survey administrator 102. The system 100 further includes a respondent client device 110, including a respondent device application 112. The respondent client device 110 is associated with a survey respondent 108. Although FIG. 1 illustrates one administrator client device 104 and one respondent client device 110, the communication system 100 may include any number of administrator and respondent client devices associated with any number of survey administrators and survey respondents.

The administrator client device 104 and the respondent client device 110 can communicate with server device(s) 116, including an electronic survey system 118, over a network 114. As described below, the server device(s) 116 enable various functions, features, processes, methods, and systems described herein using, for example, an electronic survey system 118. Additionally, or alternatively, the server device(s) 116 coordinate with the administrator client device 104 and/or the respondent client device 110 to perform or provide the various functions, features, processes, methods, and systems described in more detail below. Moreover, although FIG. 1 illustrates a particular arrangement of the administrator client device 104, the server device(s) 116, the respondent client device 110, and the network 114, various additional arrangements are possible. For example, the server device(s) 116 and the electronic survey system 118 may directly communicate with the administrator client device 104, bypassing the network 114.

Generally, the administrator client device 104 and respondent client device 110 can include any one of various types of client devices. For example, the administrator client device 104 and respondent client device 110 can be a mobile device (e.g., a smart phone), tablet, laptop computer, desktop computer, or any other type of computing device as further explained below with reference to FIG. 9. Additionally, the server device(s) 116 can include one or more computing devices including those explained below with reference to FIG. 9. The administrator client device 104, respondent client device 110, server device(s) 116, and network 114 may communicate using any communication platforms and technologies suitable for transporting data and/or communication signals, including any known communication technologies, devices, media, and protocols supportive of data communications, examples of which are described with reference to FIG. 10.

As an initial overview of one or more embodiments of the system 100, the server device(s) 116 provide the administrator client device 104 access to the electronic survey system 118 through the network 114. In one or more embodiments, by accessing the electronic survey system 118, the server device(s) 116 provide one or more electronic documents to the administrator client device 104 to allow the survey administrator 102 to compose an electronic survey. For example, certain embodiments of the electronic survey system 118 identify one or more suggested electronic survey questions and instruct the server device(s) 116 to provide electronic documents that include the one or more suggested electronic survey questions to the administrator client device 104. The electronic survey system 118 can include, for example, a website that includes of one or more webpages that allow a survey administrator 102 to create an electronic survey for distribution using the electronic survey system 118.

In particular, the administrator client device 104 can use the administrator device application 106 to facilitate communication with the electronic survey system 118 on the server device(s) 116. In some embodiments, the administrator device application 106 comprises a web browser, an applet, or other software application available to the administrator client device 104. The administrator device application 106 may coordinate communication between the administrator client device 104 and the server device(s) 116 that ultimately result in the creation of an electronic survey that the electronic survey system 118 distributes to one or more respondent client devices (e.g., respondent client device 110). To facilitate the creation of an electronic survey, the administrator device application 106 can present a graphical user interface that the electronic survey system 118 provides, detect interactions from the survey administrator 102 with the graphical user interface, and communicate user input based on the detected user interactions (e.g., with the graphical user interface) to the electronic survey system 118.

After the survey administrator 102 finishes composing an electronic survey, the electronic survey system 118 causes the server device(s) 116 to send the electronic survey to the respondent client device 110. For example, the electronic survey system 118 can provide a first electronic survey question of an electronic survey to the respondent client device 110, or alternatively, the electronic survey system 118 can provide multiple electronic survey questions of an electronic survey at the same time. Upon receiving the electronic survey, the respondent device application 112 causes the respondent client device to present the electronic survey to the survey respondent 108. The survey respondent 108 may respond to electronic survey questions within the electronic survey by providing user input via the respondent device application 112 (e.g., by selecting an answer using a touch screen or a mouse, or by inputting text data using a keyboard). In some embodiments, the respondent device application 112 comprises a web browser, an applet, a dedicated application (e.g., a dedicated electronic survey application), an instant message application, an SMS application, an email application, and/or other software application available to the respondent client device 110.

After the survey respondent 108 responds to an electronic survey question (within an electronic survey) using the respondent device application 112, the electronic survey response application 112 instructs the respondent client device 110 to send data representing the response to the server device(s) 116. The electronic survey system 118 directs the storage and analysis of the response data, for example, the electronic survey system can generate one or more survey responses reports to provide to the administrator client device 104 for presentation to the survey administrator 102.

Figure 2A:
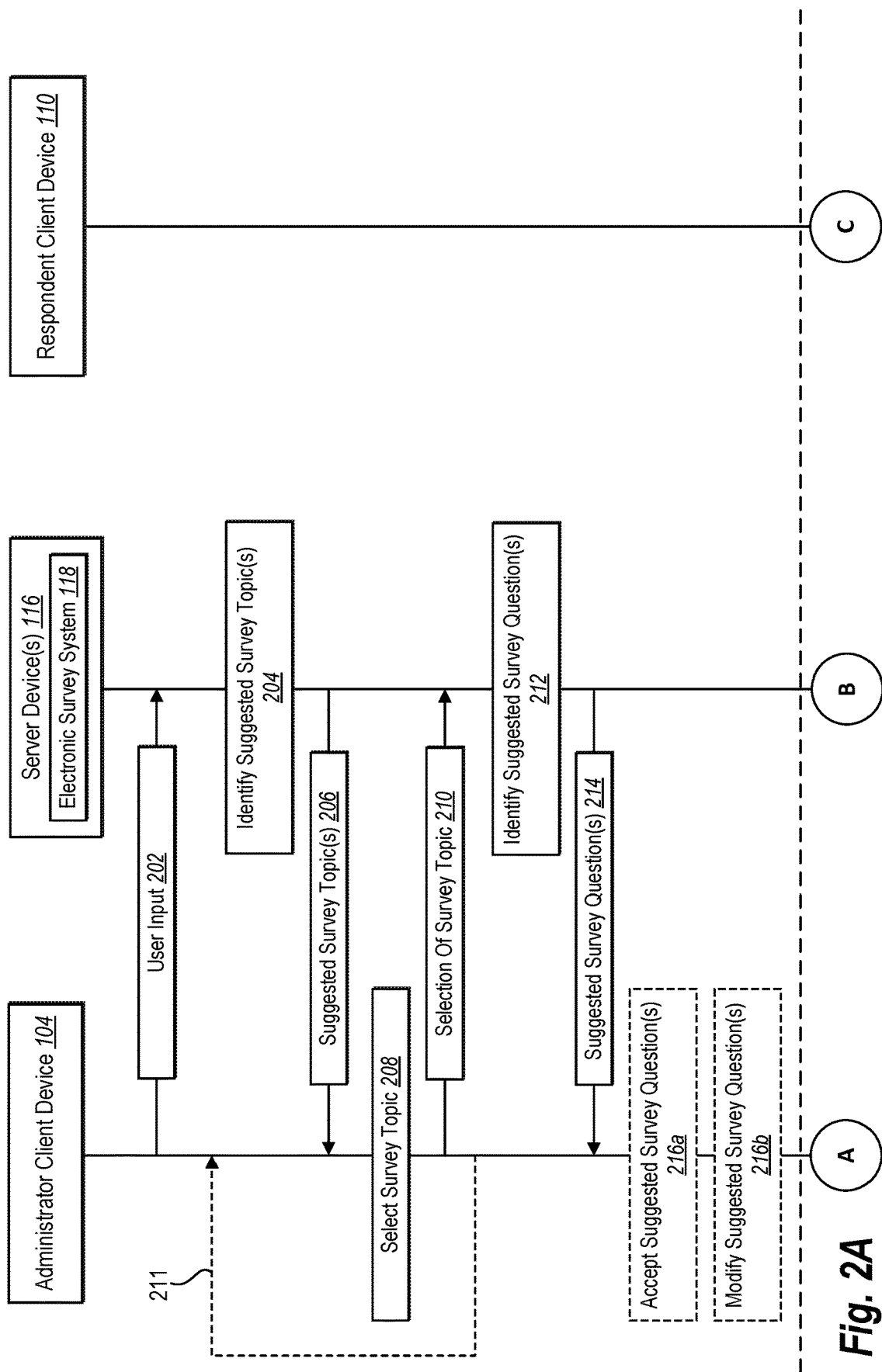
FIGS. 2A-2B illustrate sequence-flow diagrams of interactions between an administrator client device, server device(s), and a respondent client device in accordance with one or more embodiments.
Figure 2B:
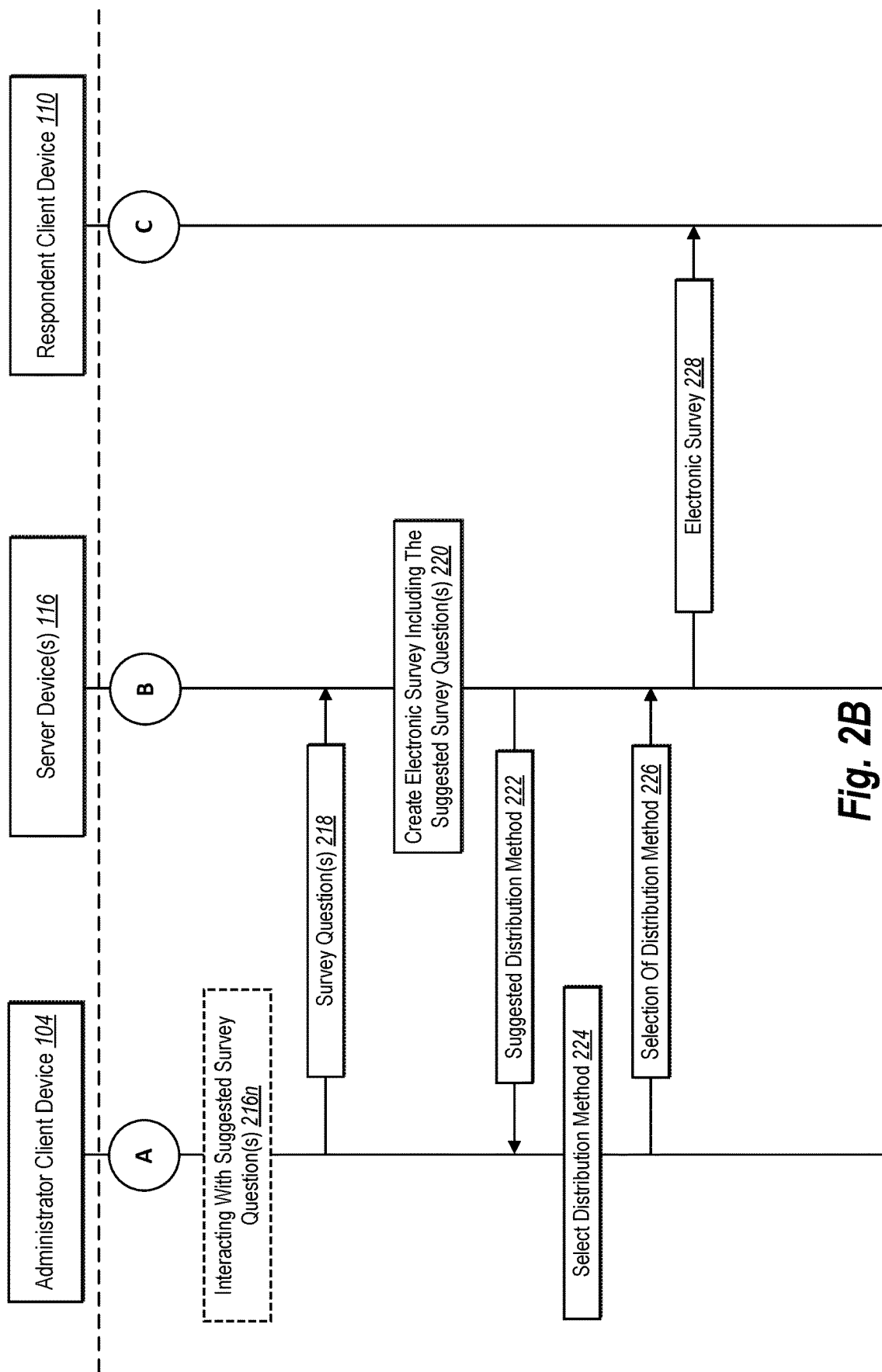

Turning now to FIGS. 2A-2B, these figures provide an overview of certain embodiments of the electronic survey system 118 that guide the creation of an electronic survey. Specifically, FIGS. 2A-2B illustrate a representation of a sequence of steps 202-228 that guide the creation of an electronic survey. As shown in FIGS. 2A-2B and as indicated above, the communication system 100 includes, in some embodiments, on the administrator client device 104, the server device(s) 116, and the respondent client device 110. In particular, some embodiments of the communication system 100 include computer-executable instructions that, when executed by the administrator client device 104, the server device(s) 116, and/or the respondent client device 110, cause the administrator client device 104, the server device(s) 116, and/or the respondent client device 110 to perform the steps 202-228 shown in the sequence diagram of FIGS. 2A-2B.

Some embodiments of the electronic survey system 118 receive user input that the electronic survey system 118 uses to determine one or more guidance features to provide for creating an electronic survey. As shown in FIG. 2A, for example, the administrator client device 104 performs step 202 of sending user input to the electronic survey system 118 on the server device(s) 116. In addition, step 202 includes the electronic survey system 118 receiving the user input. Examples of user input can include, but are not limited to, profile information, industry information, metrics for measurement, a survey topic, an identity of an organization, geographic information, customer information, other input provided by a survey administrator that the electronic survey system 118 uses to determine one or more elements of guidance. In particular, one type of user input includes a user selecting or otherwise identifying a survey topic, as will be discussed in detail below. Accordingly, the electronic survey system can receive and identify various types of user input, information associated with a survey administrator, and/or information associated with one or more draft electronic survey questions provided by a survey administrator to determine whether to provide guidance in creating an electronic survey.

For example, and as shown in FIG. 2, the electronic survey system 118 can perform step 204 of identifying suggested survey topic(s). As mentioned, in some embodiments, the electronic survey system 118 identifies the suggested survey topic(s) based on the user input received from the administrator client device 104. For example, the electronic survey system 118 can cause the server device(s) 116 to search for and identify survey topic(s) within a database that correspond to the received user input. In particular, the electronic survey system can comprise a database that correlates user input entries with survey topics that are associated with a premade electronic survey, one or more previously created electronic survey questions, and/or other guidance features or processes, as will be described further below. In such embodiments, the electronic survey system 118 may suggest a topic or premade electronic survey that complies with, for example, industry standards, government regulations, or an industry's best practices.

The electronic survey system 118 can identify various types of survey topics based on receiving user input from an administrator client device. Generally, a survey topic (or simply "topic") refers to a category that references a type or purpose of an electronic survey. For example, a survey topic can reference one or more electronic surveys that are associated with a subject (e.g., a product, a service, a company), a survey purpose (e.g., a customer feedback survey, an employee evaluation survey, a political opinion survey), a government regulation or industry standard (e.g., a survey designed to comply with a government regulation), an industry (e.g., education, politics, auto dealerships), electronic survey formats or settings (e.g., survey distribution settings, question types and formats), a best practice in a field or industry (e.g., a survey designed to follow best practices for entry surveys, annual reviews, exit surveys in the human resource field), and/or any other electronic survey category that references a type or purpose of an electronic survey. In addition, identifying a survey topic can include identifying a combination of survey topics (e.g., a customer feedback survey within a particular industry).

To illustrate, the electronic survey system 118 can receive user input from the administrator client device 104 that identifies an industry. In response to the identified industry from the user input, the electronic survey system 118 can cause the server device(s) 116 to search for and identify an electronic survey associated with data representing the same or similar industry that the user input identifies. For example, in the event the user input includes an indication that a survey administrator is interested in creating a survey related to auto dealerships, the electronic survey system 118 can suggest one or more survey topics related to auto dealerships. Similarly, in the event the user input indicates that a survey administrator is interested in creating a survey for complying with a government regulation, the electronic survey system 118 can suggest one or more survey topics related to the government regulation.

After identifying suggested survey topic(s), the electronic survey system can perform step 206 of providing suggested survey topic(s) to the administrator client device 104. For example, in certain embodiments, providing a suggested survey topic can include the electronic survey system 118 causing the server device(s) 116 to provide one or more electronic survey options representing (or related to) a suggested electronic survey topic. In some embodiments, the electronic survey options are selectable options associated with one or more guidance features to assist the survey administrator in creating an electronic survey. For instance, an electronic survey option can be associated with an electronic survey template, a premade electronic survey, and/or one or more electronic survey questions. In particular, the electronic survey options may include selectable links that point to one or more guidance features or processes for creating an electronic survey.

By detecting or receiving a selection of a survey topic, the electronic survey system 118 may provide detailed guidance to create an electronic survey. As shown in FIG. 2A, for example, the administrator client device 104 may perform the step 208 of receiving a selection of a survey topic after receiving the suggested survey topic(s) from the server device(s) 116. For example, the administrator client device 104 may receive input from the survey administrator 102—such as through a touch gesture or mouse click—that the electronic survey creation application 106 detects with respect to an electronic survey option associated with a survey topic. Based on the selection of the survey topic, the administrator client device 104 sends an indication of the selection of the survey topic to the electronic survey system 118 on the server device(s) 116, as shown in step 210.

In some embodiments, the electronic survey system 118 updates suggested survey topic(s) based on additional user input. For example, and as illustrated in FIG. 2A, the steps 202, 204, and 206 may repeat in a feedback loop 211 in which the electronic survey system 118 receives additional user input, identifies additional survey topics, and updates the survey topics with the additional survey topics. Accordingly, the electronic survey system 118 may refresh the suggested survey topics by adding or removing suggested survey topic(s) to be provided to the administrator client device 104 based on one or more additional user inputs.

The feedback loop 211 can take a variety of forms. For instance, in some embodiments, the electronic survey system 118 provides a suggested survey topic that points to one or more additional survey topics. Thus, for example, the feedback loop 211 generates an "interview" process that includes a decision tree based on a survey administrator selecting one or more suggested survey topics. To illustrate, a user can provide input that causes the electronic survey system 118 to identify and suggest a survey topic with a selectable option that relates to an education survey the for a particular government regulation (e.g., a selectable option for "No Child Left Behind Survey"). Based upon the survey administrator selecting the option, the electronic survey system 118 can perform the feedback loop 211 to identify one or more additional survey topics and/or prompt additional user input. For instance, the electronic survey system 118 can provide selectable options that allow the user administrator to identify a state, a school district, a school, a grade level, and/or other information that eventually results in the electronic survey system 118 suggesting one or more electronic survey questions.

For example, in one or more embodiments, the electronic survey system 118 provides specific guidance concerning the content of an electronic survey based upon user input indicating a selection of a survey topic. In particular, the electronic survey system 118 identifies one or more suggested electronic survey questions based on the received user input and/or the selected survey topic, as indicated in step 212 shown in FIG. 2A. For instance, the electronic survey system 118 may identify a premade electronic survey, or additionally or alternatively, the electronic survey system 118 may identify one or more previously composed electronic survey questions (from within a database) that are associated with data corresponding to the received user input or selected survey topic.

To illustrate, in the event the survey administrator 102 selects one or more survey topics related to "No Child Left Behind Survey" for a particular state and particular grade level, the electronic survey system 118 can identify a premade electronic survey (from within a survey database) that includes one or more premade electronic survey questions that meet the government regulation. The premade electronic survey questions, however, may likewise be designed to satisfy other standards, such as industry standards or best practices. As an additional illustration, upon receiving one or more survey topic selections corresponding to "customer feedback" within the industry of "auto dealerships," the electronic survey system 118 can search for and identify one or more previously composed electronic survey questions related to "customer feedback" and "auto dealerships." For instance, previously composed electronic survey questions can be associated with metadata that indicates one or more characteristics about the electronic survey question, and accordingly, the electronic survey system 118 can identify one or more questions to suggest based on a relation between a suggested topic and metadata associated with a previously composed electronic survey question.

Upon identifying one or more suggested electronic survey questions, the electronic survey system 118 provides the suggested survey question(s) to the administrator client device 104, as shown in step 214 of FIG. 2A. Various embodiments of the electronic survey system 118 can provide one or more suggested survey questions in a variety of ways. For example, certain embodiments of the electronic survey system 118 instruct the server device(s) 116 to provide one or more suggested electronic survey questions by updating an electronic survey template to include the one or more suggested electronic survey questions (e.g., the content of the suggested electronic survey questions). In other embodiments, the electronic survey system 118 provides an entire electronic survey in a completed form. Further embodiments, include the electronic survey system 118 providing a customized electronic survey in a completed form by customizing a premade electronic survey with information specific to user input or user information related to the survey administrator.

Regardless of the various ways in which the electronic survey system 118 provides one or more suggested survey questions, the electronic survey system 118 can optionally allow a survey administrator to interact with suggested electronic survey questions as part of the process of providing guidance to allow the survey administrator to create an effective electronic survey. As shown in FIG. 2A, the electronic survey system 118 can receive various indications of user interactions (e.g., from the survey administrator 102 on the administrator client device 104) to perform various functions with respect to one or more suggested survey questions, as indicated by steps 216*a*, 216*b*, and 216*n*. For instance, step 216*a* can include receiving one or more indications that the survey administrator accepts the suggested survey questions for inclusion within an electronic survey. Moreover, step 216*b* can include receiving one or more indications that the survey administrator has modified (e.g., changed question content) the one or more electronic survey question.

In one or more embodiments, the administrator client device 104 registers one or more interactions with respect to a suggested electronic survey question by associating the interactions with a data object representing the suggested electronic survey question. In other words, the electronic survey system 118 can provide a data object representing the suggested electronic survey question to the administer client device 104. Based on the data object, the administrator client device 104 can present the suggested electronic question to the survey administrator 102 via a graphical user interface. The survey administrator 102 can interact with the graphical user interface to modify, change, update, otherwise customize the suggested electronic survey question, and in response, the administrator client device 104 can register the various interactions with the data object representing the suggested electronic survey question. Accordingly, upon receiving an interaction from the survey administrator that indicates the suggested survey question is acceptable, the administrator client device 104 sends a modified data object (e.g., with the registered interactions) to the electronic survey system 118.

As indicated by step 216*n*, the administrator client device 104 may register interactions with data objects representing suggested survey question(s) in ways other than accepting or modifying the content of the question, such as deleting, copying, or reformatting the suggested survey question(s). In some embodiments, however, the administrator client device 104 may not register interactions with data objects representing suggested survey question(s) directly, but instead register a selection of other options that facilitate creating an electronic survey, such as a selection of an option to distribute the electronic survey with the suggested survey question(s) unchanged. Additional ways of interacting with suggested survey question(s) will be explained further below with reference to FIGS. 3A-4C.

Moving now to FIG. 2B, the electronic survey system 118 can receive from the administrator client device 104 an indication of an acceptance of the suggested survey question(s) to the electronic survey system 118, as shown in step 218. In particular, and as explained above, upon registering interactions with data objects representing suggested survey question(s), the administrator client device 104 sends the data objects to the electronic survey system, including any deletions, modifications, replacements, or indications to accept the suggested survey question(s).

Some embodiments of the electronic survey system 118 further create an electronic survey based at least in part on one or more suggested electronic survey questions. For instance, upon receiving a data object representing an accepted suggested survey question, for example, the electronic survey system 118 can create an electronic survey including the suggested survey question, as shown in step 220 of FIG. 2B. For example, the electronic survey system can generate an electronic survey data package that include one or more data objects corresponding to one or more electronic survey questions. In addition, the electronic survey can include only suggested electronic survey questions, or alternatively, the electronic survey can include a combination of suggested electronic survey question and user composed electronic survey questions. Accordingly, the electronic survey system 118 can guide a survey administrator in a process of identifying a purpose of an electronic survey, providing topic suggestions based on the identified purpose, suggesting electronic survey questions, and creating an electronic survey for distribution using the suggested electronic survey questions.

In addition to creating an electronic survey, certain embodiments of the electronic survey system 118 identify and suggest distribution methods for a created electronic survey (e.g., email, social media survey, website survey, and/or text messaging). As shown in step 221 of FIG. 2B, for example, the electronic survey system can identify a suggested distribution method. For example, some embodiments of the electronic survey system 118 can identify a suggested distribution method based on user input, survey topic, survey type, or other information associated with an electronic survey. In one or more embodiments, the electronic survey system 118 identifies a suggested distribution method based on previously distributed electronic surveys that are similar to the newly created electronic survey (e.g., have one or more characteristics in common with the newly created electronic survey).

Upon identifying a suggested distribution method, the electronic survey system can provide the suggested distribution method to the administrator client device 104, as shown in step 222 of FIG. 2B. For example, in some embodiments, the electronic survey system 118 instructs the server device(s) 116 to send an option representing a suggested distribution method. In one or more embodiments, the suggested distribution method can be sent with other options representing alternative distribution methods. To further illustrate, the server device(s) 116 may send an option to email the electronic survey as the suggested distribution method, along with alternative options to post the electronic survey on social media, to post the electronic survey on a website, or to send the electronic survey to mobile devices through text messaging.

As shown in FIG. 2B, the administrator client device 104 can perform step 224 of receiving a selection of a distribution method and step 226 of sending an indication of the selection of a distribution method to the electronic survey system 118. For example, the administrator client device 104 may receive a selection from the survey administrator 102 of the suggested distribution method, such as a selection of an option to email the electronic survey. Upon receiving that selection, the administrator client device 104 sends an indication of the selection to the server device(s) 116 for processing by the electronic survey system 118.

As noted above, some embodiments of the electronic survey system 118 also distribute the electronic survey. For example, upon receiving an indication of a selection of a distribution method (from the administrator client device 104), the electronic survey system distributes the electronic survey to the respondent client device 110, as shown in step 228 of FIG. 2B. As explained with reference to FIG. 1, for example, step 228 can include distributing the electronic survey to one or more respondent client devices using one or more selected distribution methods.

This disclosure will provide further details concerning the electronic survey system 118 by referencing FIGS. 3A-6. Generally, FIGS. 3A-6 show examples of the administrator client device 104 presenting graphical user interfaces provided by the electronic survey system 118 via a display screen of the administrator client device 104. Although this disclosure describes the administrator client device 104 presenting survey data and information within a graphical user interface from the electronic survey system 118, a person having ordinary skill in the art would understand that any component of the communication system 100 (described above with reference to FIG. 1) can perform the functions and features of the electronic survey system 118.

As suggested above, some embodiments of the electronic survey system 118 receive information from an administrator client device, such as user input, and provide guidance to create an electronic survey based on the received information. The received information may come in various forms, including user input, user information, or other information associated with the administrator client device 104 or survey administrator 102. To facilitate receiving user input, some embodiments of the electronic survey system 118 provide a graphical user interface that includes entry fields in which a survey administrator can enter user input. For example, FIG. 3A illustrates an embodiment of a graphical user interface 304 (displayed on a screen 302) that the electronic survey system 118 provides to the administrator client device 104 for the survey administrator 102 to enter user input.

Figure 3A:
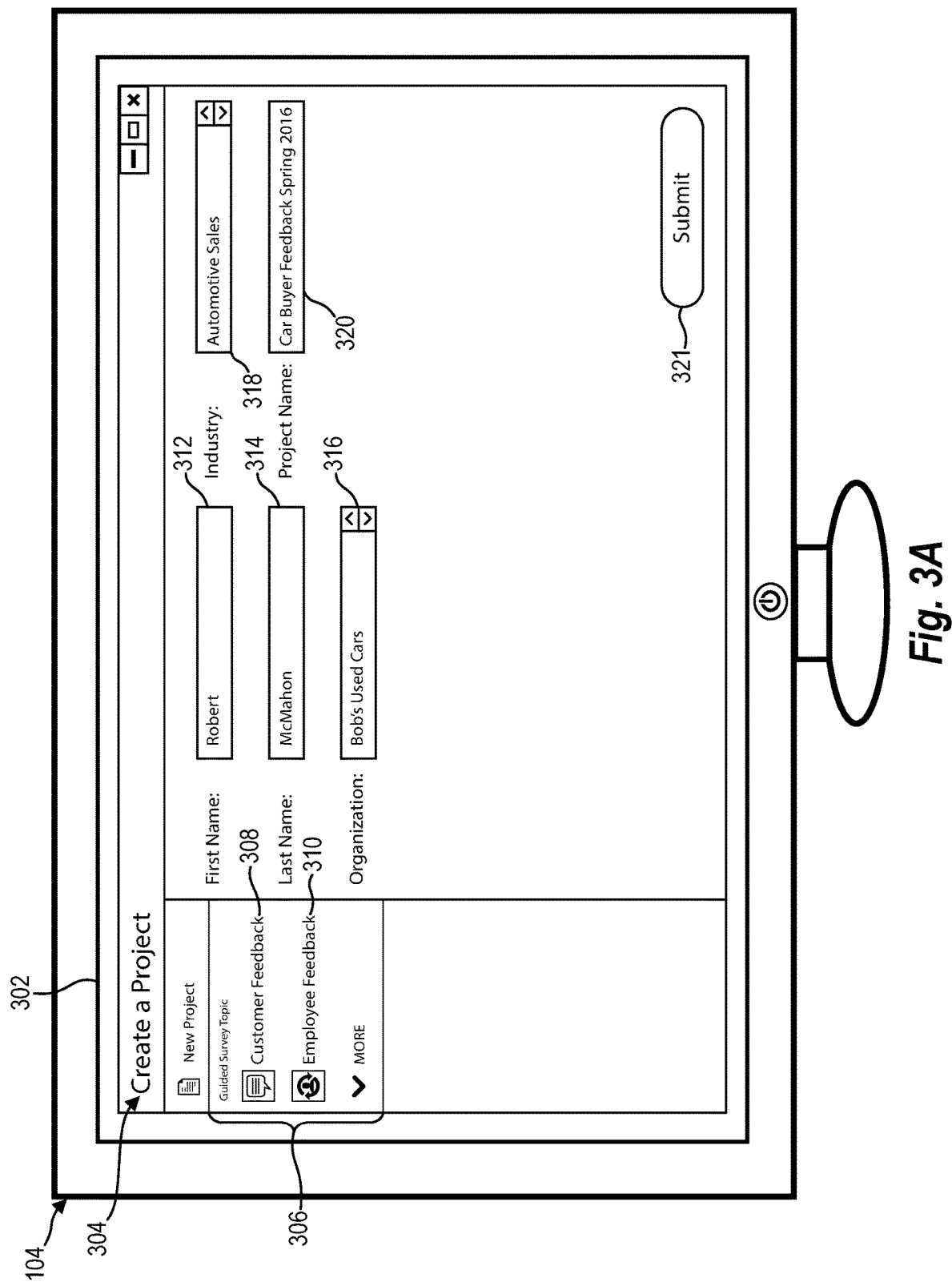
FIGS. 3A-3E illustrate graphical user interfaces showing a plurality of views of a guided electronic survey creation process in accordance with one or more embodiments.

As shown in FIG. 3A, the graphical user interface 304 includes several entry fields, including a first name entry field 312, a last name entry field 314, an organization entry field 316, an industry entry field 318, and a project name entry field 320. In some embodiments, the electronic survey system 118 provides each of the entry fields 312-320 to gather information relevant for providing guidance, such as providing a suggested electronic survey topic, identifying a suggested electronic survey, identifying a suggested electronic survey question, or creating an electronic survey template. For example, as initial steps to guiding a survey administrator in creating an electronic survey, the electronic survey system 118 prompts the survey administrator to enter a first name in the first name entry field 312, a last name in the last name entry field 314, an employer in the organization entry field 316, a description of the employer's industry in the industry entry field 318, and a name for the electronic survey project in the project name entry field 320. As described below, certain embodiments of the electronic survey system 118 analyze the user input entered into entry fields 312-320 to provide guidance when creating an electronic survey.

In some embodiments, the electronic survey system 118 provides preset options from which a survey administrator may select to enter user input. For example, the organization entry field 316 can include a drop-down menu of different organizations that are registered with an electronic survey service. As another example, the industry entry field 318 can include a drop-down menu of different industries recognized or categorized by the electronic survey system 118. Alternatively, the electronic survey system 118 can enable the survey administrator 102 to enter other user input into an entry field, such as free-form text. The electronic survey system 318 can then analyze the free-form text to identify one or more guidance options to provide (e.g., survey topic, premade electronic survey, and/or suggested electronic survey questions).

The entry fields 312-320 shown in FIG. 3A represent a non-exhaustive set of entry fields that gather user input. In some embodiments, the electronic survey system 118 provides additional entry fields to gather other user input, including, but not limited to, entry fields for product type, customer names, customer type, address, geographic market, geographic districts (e.g., geographic district over which a survey respondent is responsible).

In addition to user input entered by a survey administrator, certain embodiments of the electronic survey system 118 can identify other information associated with the administrator client device 104 without receiving user input directly from the survey administrator 102. For example, the electronic survey system 118 may detect an IP address of the administrator client device 104, a geographic location of the administrator client device 104, and/or other information associated with the administrator client device 104.

Moreover, and as mentioned, the electronic survey system 118 can identify other information associated with the survey administrator 102 without receiving direct user input. As an example of information associated with a survey administrator 102, the electronic survey system 118 may identify previous electronic surveys created by the survey administrator 102 or electronic survey questions previously composed or used by the survey administrator 102. In addition, the electronic survey system 118 can identify colleagues of the survey administrator 102 and electronic surveys or electronic survey questions composed by the colleagues of the survey administrator. For example, based on user profile information associated with the survey administrator 102 and geographic location information corresponding to the administrator client device 104, the electronic survey system can determine that the survey administrator is a third grade teacher in a particular state, and accordingly, provide one or more survey topics related to a third grade teacher in the particular state.

In one or more embodiments, the electronic survey system 118 uses profile information associated with the survey administrator 102 to identify one or more other users of the electronic survey system 118 that have profile characteristics related to the profile information of the survey administrator 102. The electronic survey system 118 can then identify information associated with the one or more other users (e.g., previous surveys, previous survey questions) for use in providing guidance or suggestions during the survey creation process.

As noted above, certain embodiments of the electronic survey system 118 provide one or more suggested electronic survey topics. In some instances, the electronic survey system 118 provides a suggested electronic survey topic in the form of a selectable survey topic option for a particular survey topic. In such embodiments, when the survey administrator 102 selects the survey topic option, the system 118 associates certain data objects with an electronic survey template for the suggested survey topic. As shown in FIG. 3A, for example, the electronic survey system 118 has provided two suggested survey topics 306 shown within the graphical user interface 304—a customer feedback topic option 308 and an employee feedback topic option 310. In this embodiment, the customer feedback topic option 308 and the employee feedback topic option 310 represent default survey topic options that the electronic survey system 118 has provided independently and without analyzing user input or information associated with the administrator client device 104.

Figure 3B:
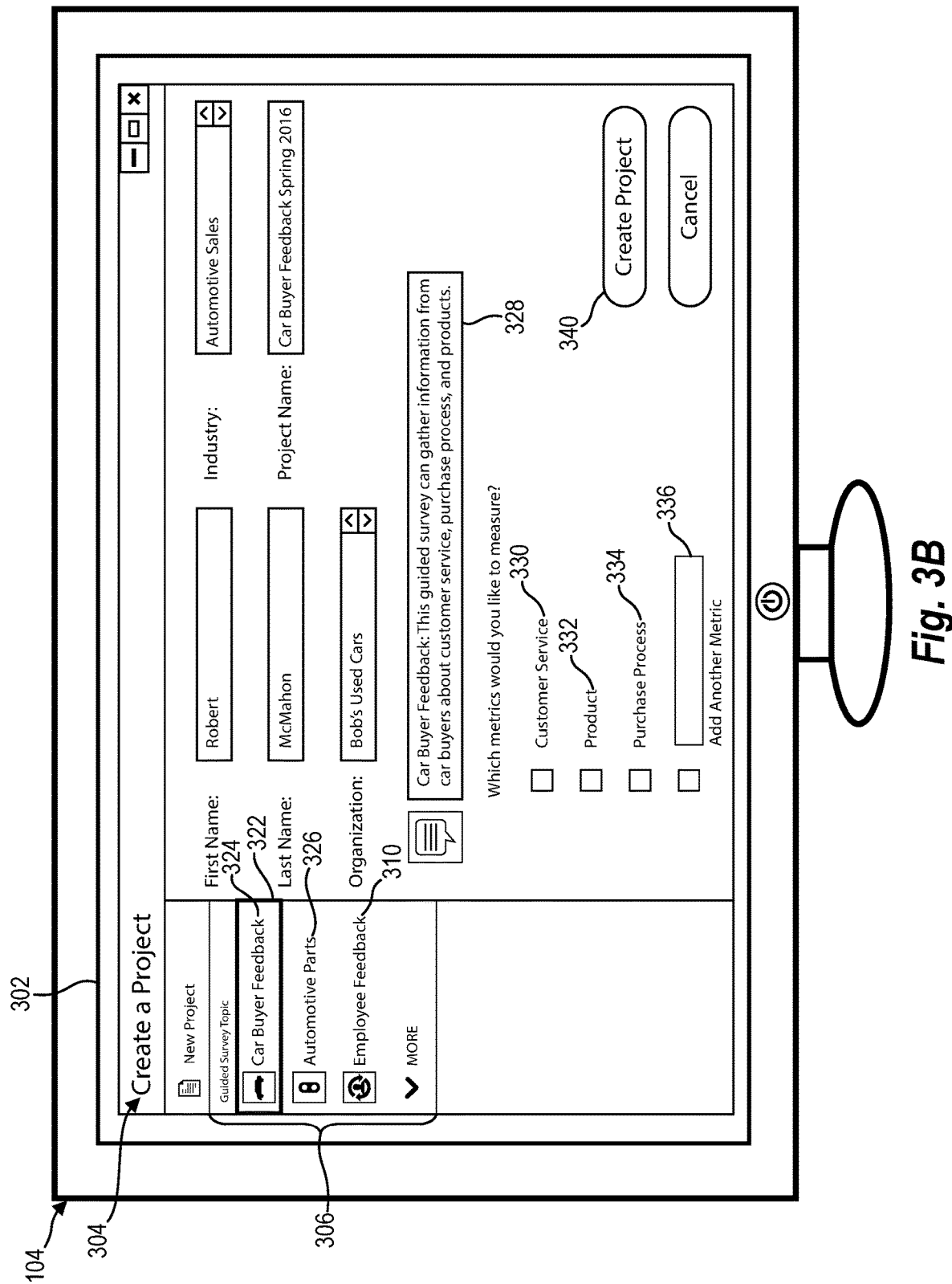

As discussed above, however, the electronic survey system 118 can identify and provide one or more suggested survey topics based on user input or other information associated with an administrator client device 104. In some embodiments, for example, these suggested electronic survey topics come in the form of a selectable survey topic option for a particular survey topic. As shown in FIG. 3B, the electronic survey system 118 has provided a couple suggested survey topic options—a car buyer feedback topic option 324 and an automotive parts topic option 326—based on the user input from the survey administrator 102 entered into the entry fields 312-320. In this embodiment, the electronic survey system 118 has provided suggested survey topic options upon receiving an indication of a selection of a submit user input option 321 from the administrator client device 104 (shown in FIG. 3A). In other embodiments, the electronic survey system 118 provides suggested survey topic options after automatically detecting user input entered into the entry fields 312-320.

To facilitate identifying suggested survey topics—or identifying suggested electronic survey questions or suggested distribution methods as described below—certain embodiments of the electronic survey system 118 maintain a database of categorized electronic surveys. The database of categorized electronic surveys includes electronic surveys associated with various data categories, such as a data category for survey topics, electronic survey questions, or distribution methods. In some embodiments, the electronic survey system 118 subdivides the database of categorized electronic surveys into such data categories. For example, the electronic survey system 118 creates a database of categorized survey topics, a database of categorized electronic survey questions, and a database of categorized distribution methods, respectively. This disclosure will describe each database in more detail below.

In embodiments using a database of categorized survey topics, the electronic survey system 118 categorizes multiple survey topics according to various data tags, such as data tags for a keyword, keyphrase, industry, organization, customer type, project name, market, product, or some other information. In some embodiments, the user input corresponds to data tags, such as the preset option of "automotive sales" in industry entry field 318 corresponding to a data tag of "automotive sales" within the database of categorized survey topics. Although some embodiments of the electronic survey system 118 identify preset options for user input as corresponding to data tags, the electronic survey system 118 does not limit data tags to correspond to such preset options.

Additionally, certain embodiments of the electronic survey system 118 create, add to, or otherwise modify survey topics and data tags based on an analysis of electronic surveys. For example, in some embodiments, the electronic survey system 118 applies natural language processing ("NLP") to previously composed or distributed electronic surveys to identify keywords or keyphrases from among these electronic surveys as survey topics or data tags.

To illustrate, the electronic survey system 118 may apply NLP to a group of previously composed electronic surveys to identify a keyphrase of "blue book value" or a keyword of "mileage" from within electronic survey questions of the previously composed electronic surveys, such as one question asking, "Do you typically price your used cars based on blue book value?," or another question asking, "Do you use a coefficient to deduct value based on mileage?" The electronic survey system 118 may further apply NLP to identify the keyphrase "used car market analysis" from a project name entry field associated with the previously composed electronic surveys, such as a previously composed electronic survey including the two questions from above. In this example, the electronic survey system 118 may identify "used car market analysis" as a survey topic based on the project name entry field and categorize the survey topic within the data tags "blue book value" and "mileage."

To identify one or more suggested survey topics, some embodiments of the electronic survey system 118 determine topic correlation scores to rank potential survey topics. In such embodiments, the electronic survey system 118 scores and ranks survey topics to compare survey topics based on user input or other information, as described above. In some embodiments, the electronic survey system 118 identifies one or more survey topics that have the highest rank based on the determined correlation scores and/or one or more survey topics that are above a threshold correlation score.

The electronic survey system 118 can determine a correlation score using a variety of methods. For example, in one or more embodiments, the electronic survey system 118 assigns points to a survey topic (from within a database of categorized survey topics) that is associated with a data tag corresponding to (e.g., matching or similar to) user input entered by a survey administrator. The electronic survey system 118 also assigns a coefficient to a survey topic that is more frequently associated with the data tag matching user input entered by the survey administrator. In such embodiments, the electronic survey system 118 sums a survey topic's points and multiplies the sum by an assigned coefficient to calculate a correlation score for each survey topic within a group (e.g., a subset of the database of categorized survey topics) and identifies the survey topics with the highest scores above a threshold as the suggested survey topics.

The foregoing example sets forth merely one embodiment of how the electronic survey system 118 identifies suggested survey topics. Other ways of identifying suggested survey topics can include different methods of assigning points (e.g., assigning points to survey topics associated with data tags that do not correspond to user input, assigning points to survey topics used by survey administrators within the same organization or same industry or with the same customer type), assigning coefficients (e.g., assigning a coefficient based on the number of instances of survey topics within the database of categorized survey topics, assigning a coefficient based on the response rate to an electronic survey associated with a survey topic within the database of categorized survey topics, assigning a coefficient to survey topics used by survey administrators within the same organization or same industry or with the same customer type), and ranking (e.g., ranking survey topics by inverse correlation score, median correlation score, or mean correlation score).

Turning now to FIG. 3B, the survey topics identified in FIG. 3B will be discussed as an example of how the electronic survey system 118 identifies suggested survey topics. In this example, the electronic survey system 118 may identify and assign 3.0 points each to survey topic of "car buyer feedback," "automotive parts," and "best new car model" from within a database of categorized survey topics based on identifying the "automotive sales" data tag associated with each of the survey topics in response to receiving the user input for the industry entry field 318 (i.e., the user input of "automotive sales"). The electronic survey system 118 could assign additional points—to survey topics such as "car buyer feedback," "automotive parts," or "best new car model"—based on identifying other data tags that include a survey topic and that match (or are similar to) user inputs of the survey administrator shown in FIG. 3B.

Continuing the example from above, the electronic survey system 118 assigns a coefficient of 6.0 to "car buyer feedback," a coefficient of 3.0 to "automotive parts," and a coefficient of 2.0 to "best new car model" when the system 118 has identified twice as many distributed electronic surveys associated with the "car buyer feedback" survey topic than distributed electronic surveys associated with the "automotive parts" survey topic, as well as identified three times as many distributed electronic surveys associated with the "car buyer feedback" survey topic than distributed electronic surveys associated with the "best new car model" survey topic. To calculate a correlation score for each survey topic, the electronic survey system 118 multiplies the assigned points for each survey topic by the assigned coefficient for each survey topic and ranks each survey topic from highest to lowest. In this example, the electronic survey system 118 ranks the "car buyer feedback" survey topic as first (with a correlation score of 18.0), the "automotive parts" survey topic as second (with a correlation score of 9.0), and the "best new car model" survey topic as third (with a correlation score of 6.0). If the survey administrator 102 had identified a threshold score of 8.0 for suggested survey topics, for example, the electronic survey system 118 would identify "car buyer feedback" and "automotive parts" as suggested survey topics, but would not identify "best new car model" as a suggested survey topic.

Consistent with the analysis above, FIG. 3B illustrates a couple suggested survey topics—provided by the electronic survey system 118—in the form of survey topic options. Specifically, the electronic survey system 118 has updated the graphical user interface 304 to include the car buyer feedback topic option 324 and the automotive parts topic option 326. The electronic survey system 118 has further updated the graphical user interface 304 to include a preferred topic suggestion indicator 322 based on ranking the "car buyer feedback" survey topic as first. As shown in FIG. 3B, the preferred topic suggestion indicator 322 identifies the highest ranking suggested survey topic with a bolded box surrounding the car buyer feedback topic option 324. In other embodiments, the preferred topic suggestion indicator 322 may take the form of a highlight, shading, or other graphical indicator to identify the highest ranking suggested survey topic.

Additionally, some embodiments of the electronic survey system 118 set a minimum or maximum number of suggested survey topics to provide as options to a survey administrator. By setting such minimum or maximum numbers, the electronic survey system 118 avoids providing too few or too many suggested survey topic options. For example, the electronic survey system 118 may set a maximum number of five suggested electronic survey topics on one screen—as a default or based on a selection by the survey administrator 102—to provide for display on a graphical user interface when a survey administrator enters user input before creating an electronic survey template for a project, such as the graphical user interface 304 shown in FIGS. 3A-3B.

Some embodiments of the electronic survey system 118 further provide a description of a suggested survey topic. This description, in certain embodiments, includes a brief synopsis of information an electronic survey covering the suggested survey topic is intended to gather. As shown in FIG. 3B, for example, the electronic survey system 118 has updated the graphical user interface 304 to include a suggested survey topic description 328, which states, "Car Buyer Feedback: This guided survey can gather information from car buyers about customer service, purchase process, and products." The suggested survey topic description 328 is one example of a brief synopsis that a description of a suggested survey topic may take. The electronic survey system 118 may provide any other suitable description. Additionally, the electronic survey system 118 may provide a suggested survey topic description for each suggested survey topic that the system 118 updates the graphical user interface 304 to include when the survey administrator 102 selects a corresponding survey topic option.

Additionally, some embodiments of the electronic survey system 118 gather information concerning a metric that a survey administrator seeks to measure with an electronic survey. In some embodiments, the electronic survey system 118 provides selectable options for a survey administrator to enter metric information. By gathering metric information, the electronic survey system 118 has more data upon which to identify one or more suggested survey topics or suggested electronic survey questions. As shown in FIG. 3B, for example, the electronic survey system 118 provides metric options 330-334 related to the car buyer feedback topic option 324—namely, a customer service metric option 330, a product metric option 332, and a purchase process metric option 334. Additionally, the graphical user interface 304 includes the question "Which metrics would you like to measure?" directly above the metric options 330-336 to prompt the survey administrator 102 to interact with the metric options 330-334.

In this particular embodiment, based on the survey administrator 102 selects the customer service metric option 330, the product metric option 332, or the purchase process metric option 334, the electronic survey system 118 searches for and/or identifies suggested electronic survey questions that measure or evaluate customer service, products, or purchase process, respectively. Metric options 330-334 are merely examples of possible metric options that the electronic survey system 118 may identify and provide to a survey administrator. A person having ordinary skill in the art will recognize that the electronic survey system 118 may provide many other metric options that gather information about other metrics, including, but not limited to, metrics that measure information about customers, employee satisfaction, and healthcare, depending on the user input entered by a survey administrator.

In addition to the metric options 330-334, the electronic survey system 118 provides a metric option that enables a survey administrator to enter an additional, but unidentified, metric for measurement. As shown in FIG. 3B, the electronic survey system 118 provides within the graphical user interface 304 an additional metric option 336. By providing the additional metric option 336, the electronic survey system 118 provides a field in which the survey administrator 102 may enter text to identify additional to measure with an electronic survey. Similar to the analysis above, certain embodiments of the electronic survey system 118 apply NLP to the text entered in the additional metric option 336 to identify keyphrases or keywords with corresponding data tags for a suggested survey topic, a suggested electronic survey, and/or a suggested electronic survey question.

Upon a survey administrator providing various input and making various selections, as described above, one or more embodiments of the electronic survey system 118 then prompt the survey administrator to proceed to create a survey project. For example, and as shown in FIG. 3B, the electronic survey system 118 provides a create project option 340 within the graphical user interface 304 that allows a survey administrator to proceed with creating an electronic survey based on the various user input and selections that the survey administrator provided, as well as other information as described above with reference to FIGS. 2A-2B. Accordingly, based upon detecting a selection of the create project option 340, the electronic survey system 118 utilizes the user input, selections, and other information to identify a suggested electronic survey and/or one or more suggested electronic survey questions to provide for presentation to the survey administrator via the graphical user interface 304.

In one or more embodiments, when the survey administrator 102 selects the create project option 340, for example, the electronic survey system 118 creates an electronic survey template and associates one or more data objects corresponding to a suggested electronic survey(s) or suggested electronic survey question with the electronic survey template. In some embodiments, the data objects include data representing previously composed electronic surveys or previously composed electronic survey questions from other users of the electronic survey system, from a professional survey author, or from the survey administrator that is creating the electronic survey. The data objects can be referenced within a database table and associated with various data tags that indicate one or more characteristics about a suggested electronic survey or a suggested electronic survey question. Accordingly, the electronic survey system 118 categorizes premade or previously used electronic survey questions using various data tags—similar to the data tags described above with respect to data tags for a keyword, keyphrase, industry, organization, customer type, project name, or other information.

Certain embodiments of the electronic survey system 118 generate data tags for an electronic survey or an electronic survey question based on an analysis of the electronic survey or the electronic survey question. For example, in some embodiments, the electronic survey system 118 applies NLP to previously composed or distributed electronic survey questions to identify keywords or keyphrases from among the electronic survey questions as data tags. To illustrate, the electronic survey system 118 may apply NLP to previously composed electronic survey questions, such as a first question asking, "Which car manufacturer do you think makes the most reliable cars?," and a second question asking, "Would you consider purchasing a used car that has been in an accident?" Applying NLP, the electronic survey system 118 may analyze the first question to identify a keyphrase of "car manufacturer" and analyze the second question to identify a keyword of "accident." Based on this analysis, the electronic survey system 118 may create a data tag of "car manufacturer" and associate the first question with the "car manufacturer" data tag, as well as create a data tag of "accident" and associate the second question with the "accident" data tag.

In addition, some embodiments of the electronic survey system 118 add to or modify data tags based on analysis of electronic survey questions. For example, the electronic survey system 118 may change the data tag of "car manufacturer" to "carmaker," based on an NLP analysis over time identifying that electronic survey questions more frequently use the keyword "carmaker" rather than "car manufacturer." Accordingly, the electronic survey system 118 categorizes electronic survey questions that use either the keyword "carmaker" or the keyphrase "car manufacturer" within the data tag of "carmaker." The modification of "car manufacturer" to "carmaker" is merely an example of a modification.

In addition, a single electronic survey question can be associated with multiple data tags. For instance, and based on the example question above of "Would you consider purchasing a used car that has been in an accident?," the electronic survey system 118 can use NLP to identify or otherwise generate multiple data tags. To illustrate, based on an NLP analysis of the above-stated survey question, the electronic survey system 118 creates the data tags "accident," "used car," and/or "car purchase." Accordingly, the electronic survey system 118 can create and associate data tags with an electronic survey question that would allow for the identification of the question in a variety of different circumstances based on particular user input, user selections, and/or other information.

Moreover, based on the NLP or other similar analysis, the electronic survey system 118 can also identify a predefined data tag to associate with an electronic survey or an electronic survey question. For example, the electronic survey system 118 can analyze an electronic survey question to determine one or more predefined data tags from a plurality of possible predefined data tags to which the electronic survey question aligns. To illustrate, and again referencing the above-stated question, the electronic survey system can analyze the electronic survey question and determine that the question most closely aligns with a "Car Dealer" predefined data tag. In one or more embodiments, a predefined data tag a data tag defined by a system administrator. Alternatively, a predefined data tag is simply a previously generated data tag based on an analysis of a prior electronic survey question.

Regardless of a particular data tag determined to correspond to an electronic survey question, each of the data tags identified for an electronic survey question may be associated with a significance score that indicates the significance of a particular data tag to the electronic survey question. For instance, for the example question of "Would you consider purchasing a used car that has been in an accident?," the electronic survey system 118 can assign a higher significance score to the data tag of "accident" based on an NLP analysis indicating that "accident" represents a main point of the electronic survey question. Accordingly, when the electronic survey system 118 searches for electronic survey questions to suggest to a survey administrator, the electronic survey system can utilize the significance score associated with each data tag corresponding to a particular electronic survey question to determine how related the particular electronic survey question is to a determined need (e.g., user input) compared to other identified electronic survey questions.

In particular, to identify one or more suggested electronic survey questions (or one or more electronic surveys) to suggest to a survey administrator for guidance in the creation of an electronic survey, some embodiments of the electronic survey system 118 rank electronic survey questions. In such embodiments, the electronic survey system 118 determines a relevance score and ranks electronic survey questions with respect to how relevant each electronic survey question (e.g., within a database of electronic survey questions) is to user input or other information associated with the survey administrator (e.g., user input described with reference to FIGS. 3A and 3B). For example, the electronic survey system 118 can identify suggested electronic survey questions based on determining one or more electronic survey questions that have the highest rank based on the relevance score and/or one or more electronic survey questions that are above a threshold relevance score.

In one such embodiment, the electronic survey system 118 assigns points to an electronic survey question based on how well a data tag corresponds to user input or other information associated with a survey administrator. In addition, the electronic survey system 118 can also assign a coefficient to an electronic survey question that is more frequently associated with a survey topic that corresponds to (e.g., matches or is similar to) a survey topic selected by the survey administrator. In such an embodiment, the electronic survey system 118 determines a relevance score of an electronic survey question by multiplying the points by the assigned coefficient to calculate a score for each electronic survey question, and accordingly, identifies the electronic survey questions with the highest relevance scores as the suggested electronic survey questions.

Alternatively, the electronic survey system 118 can identify a preset number of the highest ranked electronic survey questions based on the relevance score for each electronic survey question. Additionally, some embodiments of the electronic survey system 118 set a minimum or maximum number of suggested electronic survey questions to provide to a survey administrator. By setting such minimum or maximum numbers, the electronic survey system 118 avoids providing too few or too many suggested electronic survey questions to a survey administrator. For example, the electronic survey system 118 may set a maximum number of 50 suggested electronic survey questions—as a default or based on a selection by the survey administrator 102—to provide within an electronic survey template.

In some embodiments, the electronic survey system 118 filters electronic survey questions to identify and eliminate duplicate or near-duplicate electronic survey questions within a list of identified suggested electronic survey questions. In other embodiments, the electronic survey system 118 filters the available electronic survey questions to be used as suggested electronic survey questions within the database of categorized electronic survey questions (e.g., a pre-filter process that reduces the number of questions within the database of electronic survey questions). By filtering electronic survey questions to eliminate duplicate or near-duplicate electronic survey questions, the electronic survey system 118 avoids providing the same or similar suggested electronic survey questions to a survey administrator.

For example, certain embodiments of the electronic survey system 118 apply NLP to electronic survey questions within the database of categorized electronic survey questions—or a subset of electronic survey questions within the database of categorized electronic survey questions—to identify duplicate or near-duplicate electronic survey questions before assigning points, assigning coefficients, calculating scores, or ranking electronic survey questions. Other embodiments of the electronic survey system 118, however, apply NLP to electronic survey questions during different stages of the process to identify suggested electronic survey questions, including after one, all, or some of the steps of assigning points, assigning coefficients, calculating scores, and ranking electronic survey questions.

The foregoing example sets forth merely one embodiment of how the electronic survey system 118 identifies suggested electronic survey questions. Other ways of identifying suggested electronic survey questions include different methods of assigning points (e.g., assigning points to electronic survey questions associated with data tags that do not correspond to user input, assigning points to electronic survey questions used by survey administrators within the same organization or same industry or with the same customer type), assigning coefficients (e.g., assigning a coefficient based on the number of instances of an electronic survey question within the database of categorized electronic survey questions), assigning a coefficient based on the response rate to an electronic survey question within the database of categorized electronic survey questions, assigning a coefficient to electronic survey questions used by survey administrators within the same organization or same industry or with the same customer type), and ranking (e.g., ranking electronic survey questions by inverse score, median score, or mean score).

Figure 3C:
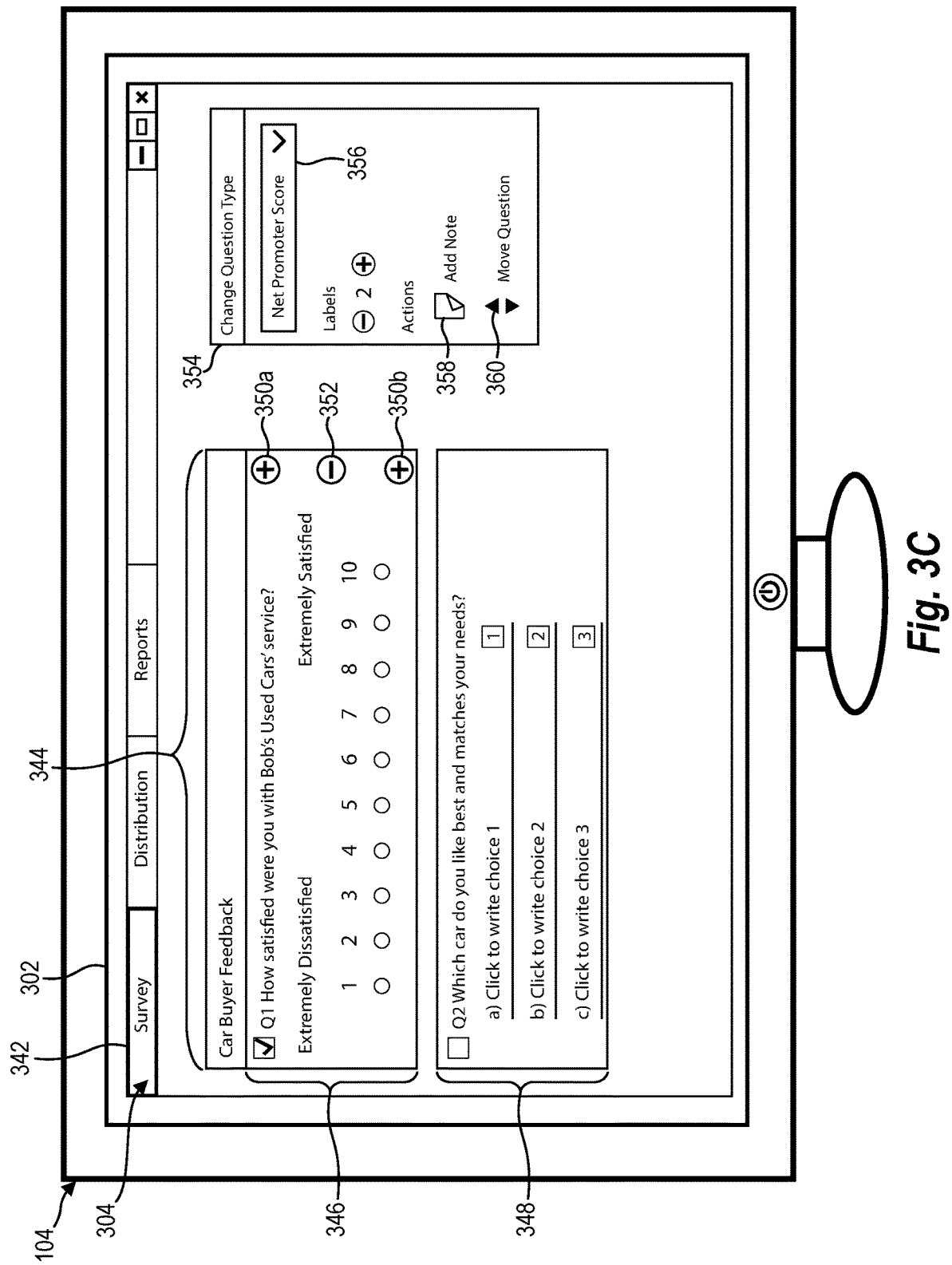

Notwithstanding the various methods and processes that may be used to identify a suggested electronic survey question (or a suggested electronic survey), the electronic survey system 118 can provide the one or more suggested electronic survey questions for presentation to a survey administrator via graphical user interface 304. In particular, FIG. 3C illustrates an electronic survey template that includes a suggested electronic survey question. Specifically, the electronic survey system 118 provides, via the graphical user interface 304, a survey tab 342 and an electronic survey template 344 with a suggested electronic survey question, identified as Q1 within the question block 346. Q1 asks, "How satisfied were you with Bob's Used Cars' service?" As shown in FIG. 3C, Q1 includes a fully composed suggested electronic survey question, including an answer component with Net Promoter Score® answer choices 1-10.

In providing a suggested electronic survey question, the electronic survey system 118 can customize the suggested electronic survey question based on user input or other information associated with a survey administrator. For example, and as illustrated in FIG. 3C, the question content in Q1 includes the organization name of "Bob's Used Cars" within the content. In other words, in one or more embodiments, an electronic survey question can include one or more form fields within the content of the electronic survey question, where a form field references a particular data type to include within the field. For example, Q1 can include a form field of [organization name] within the question portion. Accordingly, when the electronic survey system 118 determines to provide Q1, the electronic survey system 118 can locate user input provided with respect to the organization entry field 316, and provide that user input within the suggested electronic survey question. In other embodiments, the question content within a suggested electronic survey question can include one or more selectable prompts that allow a user to enter specific information to customize the suggested electronic survey question in the event the electronic survey system fails to identify user input or other information that corresponds with a particular form field.

As noted above, certain embodiments of the electronic survey system 118 enable a survey administrator to modify the content of a suggested electronic survey question. As shown in FIG. 3C, for example, the electronic survey system 118 has provided a question type menu 354 with tools for modifying Q1. The question type menu 354 includes a question type selector 356 that, based on a selection from a survey administrator, provides different survey question type options for Q1, such as multiple choice, rank order, text entry questions, matrix or table questions.

When the survey administrator 102 selects a different survey question type option, the electronic survey system 118 associates data objects with the question block 346 to modify the format of Q1 (including the answer choices) to correspond to the selected electronic survey question type. For example, when the survey administrator 102 selects a multiple choice type option, the electronic survey system 118 updates the graphical user interface 304 to include answer choices in a multiple choice format instead of a Net Promoter Score® format.

In addition to associating data objects to format a question block, some embodiments of the electronic survey system 118 provide options to initiate an action that is associated with a selected electronic survey question. As illustrated in FIG. 3C, for example, the question type menu 354 includes an add note option 358 and a move question option 360 that enable the survey administrator 102 to add a text note to Q1 or to move the location of Q1 within the electronic survey template 344 (e.g., reordering Q1 in relation to other electronic survey questions within the electronic survey template 344).

Similarly, in some embodiments, the electronic survey system 118 provides an option to perform an action based on a response to an electronic survey question, such as a follow-up action. For example, a question type menu may provide a survey respondent a follow-up option (not shown) that sends a notification to the survey administrator 102 to follow up with a respondent based on his or her response. In one or more such embodiments, the electronic survey system 118 further provides a predetermined or default message to the administrator client device 104 for the survey administrator 102 to send to the survey respondent 108 to follow-up with the survey respondent 108 based on his or her response (e.g., a predetermined e-mail message asking a customer how a company can improve based on a response of "Extremely Dissatisfied" to Q1). Additionally, in one or more such embodiments, the electronic survey system 118 sends a notification to the administrator client device 104 suggesting that the survey administrator 102 follow up by offering the survey respondent 108 a reward or consolation benefit based on his or her response (e.g., an e-mail message to a customer providing a coupon based on a response of "Extremely Dissatisfied" to Q1).

In addition to providing one or more suggested electronic survey questions, certain embodiments of the electronic survey system 118 provide options and tools to compose electronic survey questions within an electronic survey template that also includes one or more suggested electronic survey questions. As shown in FIG. 3C, for example, the electronic survey system 118 provides question block multipliers 350*a* and 350*b* that, based on a selection from a survey administrator, causes the electronic survey system 118 to add a question block within the electronic survey template 344. As shown in FIG. 3C, based upon the survey administrator 102 selecting the question block multiplier 350b, the electronic survey system 118 provides a question block 348 within the graphical user interface 304. Additionally, and as shown in FIG. 3C, the electronic survey system 118 can also provide a question block subtractor 352 that, based on a selection from a survey administrator, causes the system 118 to delete the question block 346, including the suggested electronic survey question, Q1.

In addition to providing suggested electronic survey questions, the electronic survey system 118 can further provide guidance to a survey administrator by providing suggestions directed toward a user composed question (e.g., the user composed question that a system administrator composed within question block 348, as shown in FIG. 3C). In response to receiving a user composed electronic survey question, the electronic survey system 118 can analyze the user composed electronic survey question to identify one or more elements or characteristics that indicate a potentially ineffective electronic survey question (e.g., poor question type choice or poor question wording).

For example, some embodiments of the electronic survey system 118 apply NLP to electronic survey questions composed or imported into an electronic survey template to detect characteristics of the electronic survey questions. Conversely, some embodiments of the electronic survey system 118 perform NLP—with reference to other electronic survey questions—to generate a suggested revision to the electronic survey question. In some instances, the electronic survey system 118 references an electronic dictionary or a set of electronic grammar rules to analyze and suggest revisions to electronic survey questions.

To illustrate, some embodiments of the electronic survey system 118 apply NLP to an electronic survey question within an electronic survey template to search for and detect a double negative (or other multiple negative) or a compound question within the electronic survey question. When searching for double, triple, or multiple negatives within an electronic survey question, the electronic survey system 118 applies NLP to detect, for example, negative words, such as "not," "no," "won't," "can't," or negative prefixes, such as "irr-," "un-," "non-," or "in-." Once the electronic survey system 118 detects a double negative (or other multiple negative), the electronic survey system 118 uses NLP to generate a suggested revision to the electronic survey question (e.g., to provide for presentation to a survey administrator as a selectable option) that rephrases the question with positive word choices.

When searching for a compound question, the electronic survey system 118 applies NLP to detect, for example, electronic survey questions with clusters of subjects, verbs, and objects; with clusters of verbs and objects for a single subject; or with clusters of objects of a single verb. Once the electronic survey system 118 detects a compound question, the system 118 uses NLP to generate a suggested revision to the electronic survey question (for presentation to a survey administrator as a selectable option) that breaks up the compound question into two or more separate electronic survey questions.

Figure 3D:
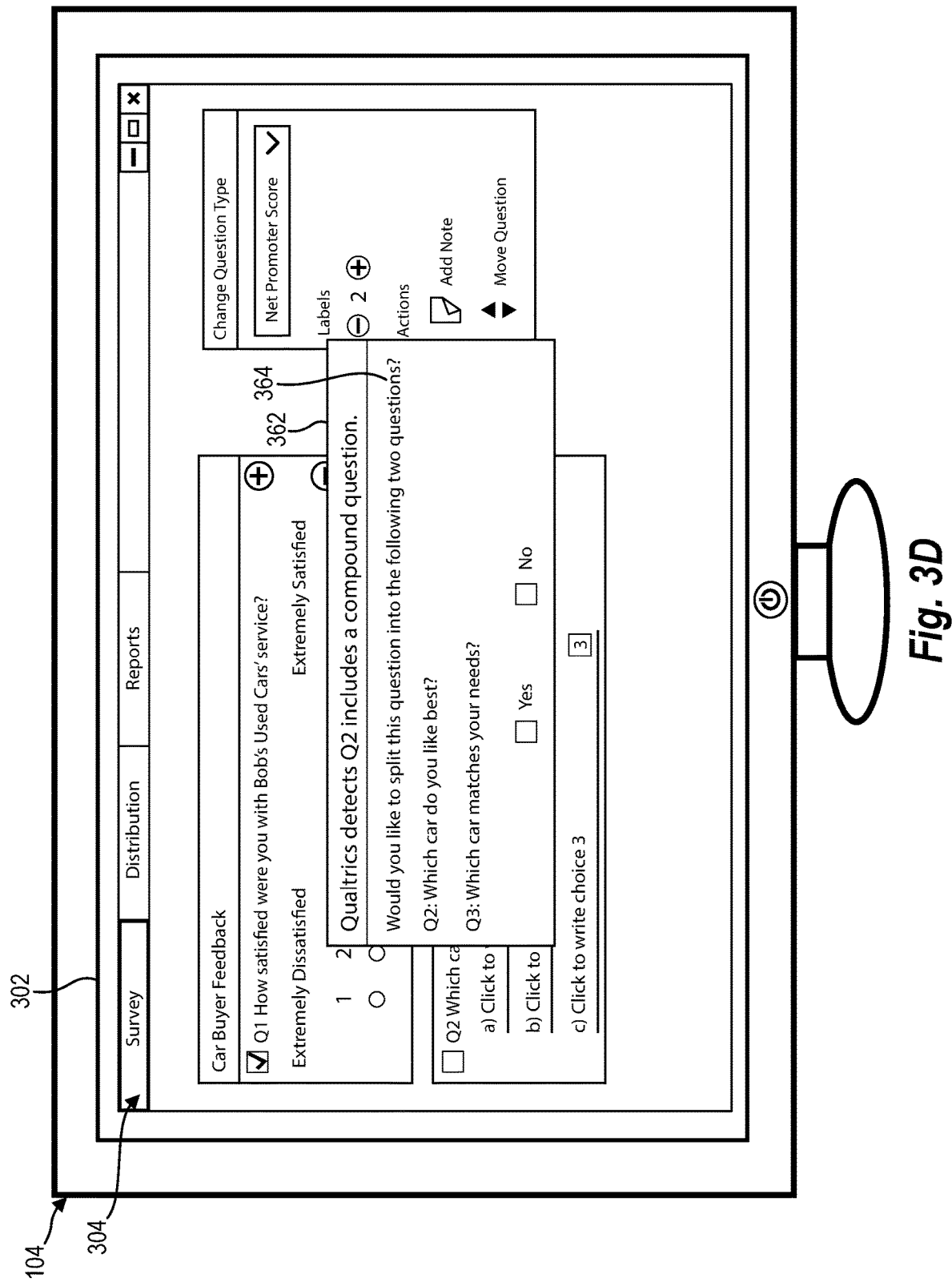

To illustrate, the user composed question of Q2 shown in FIG. 3C states: "Which car do you like best and matches your needs?" The electronic survey system 118 analyzes this user composed question using NLP or other analysis tool to determine that Q2 is a compound question with a first word cluster including a subject, verb, and object ("Which car do you like best?") and second word cluster including the same subject with another verb and object ("Which car matches your needs"). Based on detecting the compound question, the electronic survey system 118 can provide a detection notice 362 within the graphical user interface 304 to include a detection notice 362 communicating that Q2 includes a compound question, as shown in FIG. 3D. In particular, FIG. 3D illustrates that the detection notice 362 can be a popup window. In alternative embodiments, the detection notice may include another graphical indication, such as highlighting Q2 in red to indicate Q2 has a potential problem.

As further shown in FIG. 3D, the electronic survey system 118 can also provide a suggested revision 364 that breaks up the compound question into two separate questions. After generating the suggested revision 364, the electronic survey system 118 can provide the suggested revision 364 within the graphical user interface 304 (e.g., within the revision notice 362). In particular, and as shown in FIG. 3D, the suggested revision notice 364 says, "Would you like to split this question into the following two questions?" and includes two selectable options—one for "Yes" and one for "No"—that enable the survey administrator 102 to accept or reject the suggested revisions. The suggested revisions include two separate questions—"Q2 Which car do you like best?" and "Q3 Which car matches your needs?"

Additionally, some embodiments of the electronic survey system 118 apply NLP—with reference to the electronic dictionary or the set of electronic grammar rules—to a user composed electronic survey question within an electronic survey template to search for and detect a grammatical error or a spelling error. When searching for grammatical or spelling errors, the electronic survey system 118 applies NLP—with reference to the electronic dictionary or the set of electronic grammar rules—to detect, for example, misspelled words, misused homonyms, subject-verb agreement problems, antecedent basis problems, misused singular or plural nouns, or consecutive nouns. Once the electronic survey system 118 detects a spelling or grammatical error, the system 118 generates a suggested revision to the electronic survey question (for presentation to a survey administrator as a selectable option) that includes a list of correctly spelled word options (according to the electronic dictionary) from which the survey administrator 102 may choose or a list of suggested rephrased sentence options (according to the set of electronic grammar rules) from which the survey administrator 102 may choose.

As another example, some embodiments of the electronic survey system 118 analyze entry fields within a question block of an electronic survey template to search for and detect the presence or absence of an answer choice. When searching for the presence or absence of an answer choice, the electronic survey system 118 analyzes an answer portion of a question block to detect, for example, whether the default text for answer choices has been altered. Once the electronic survey system 118 detects the absence of an answer choice, the system 118 provides a notice that one or more answer choices are missing within a question block and provides a selectable option to insert answer choices, including suggested answer choices—from one or more suggested electronic survey questions—identified using the process of assigning points, assigning coefficients, calculating scores, and ranking electronic survey questions described above.

Moreover, various embodiments of the electronic survey system 118 can count words to provide a suggestion to create a more effective electronic survey question. When counting words, the electronic survey system 118 analyzes a question portion of a question block to count words and compare the word count to a word limit. Once the electronic survey system 118 detects an electronic survey question exceeds the word limit, the electronic survey system 118 provides a notice that the electronic survey question exceeds the word limit (or contains a certain number of words) and provides a selectable option that includes a suggested electronic survey question with fewer words, including suggested electronic survey questions identified using the process of assigning points, assigning coefficients, calculating scores, and ranking electronic survey questions described above.

As suggested above, some embodiments of the electronic survey system 118 provide a suggested portion of an electronic survey question, such as a suggested question portion of an electronic survey question or a suggested answer portion of an electronic survey question. Additionally, some embodiments of the electronic survey system 118 identify a suggested electronic survey question or a suggested portion of an electronic survey question based in whole or in part on user input during the composition of an electronic survey, such as a survey administrator's acceptance or rejection of a suggested electronic survey question or content of an electronic survey question composed or imported by a survey administrator. For example, the electronic survey system 118 may apply NLP to analyze content of an electronic survey question composed by a survey administrator and—based on that analyzed content—identify a suggested portion of an electronic survey question from within the database of previously composed or premade electronic survey questions.

Figure 3E:
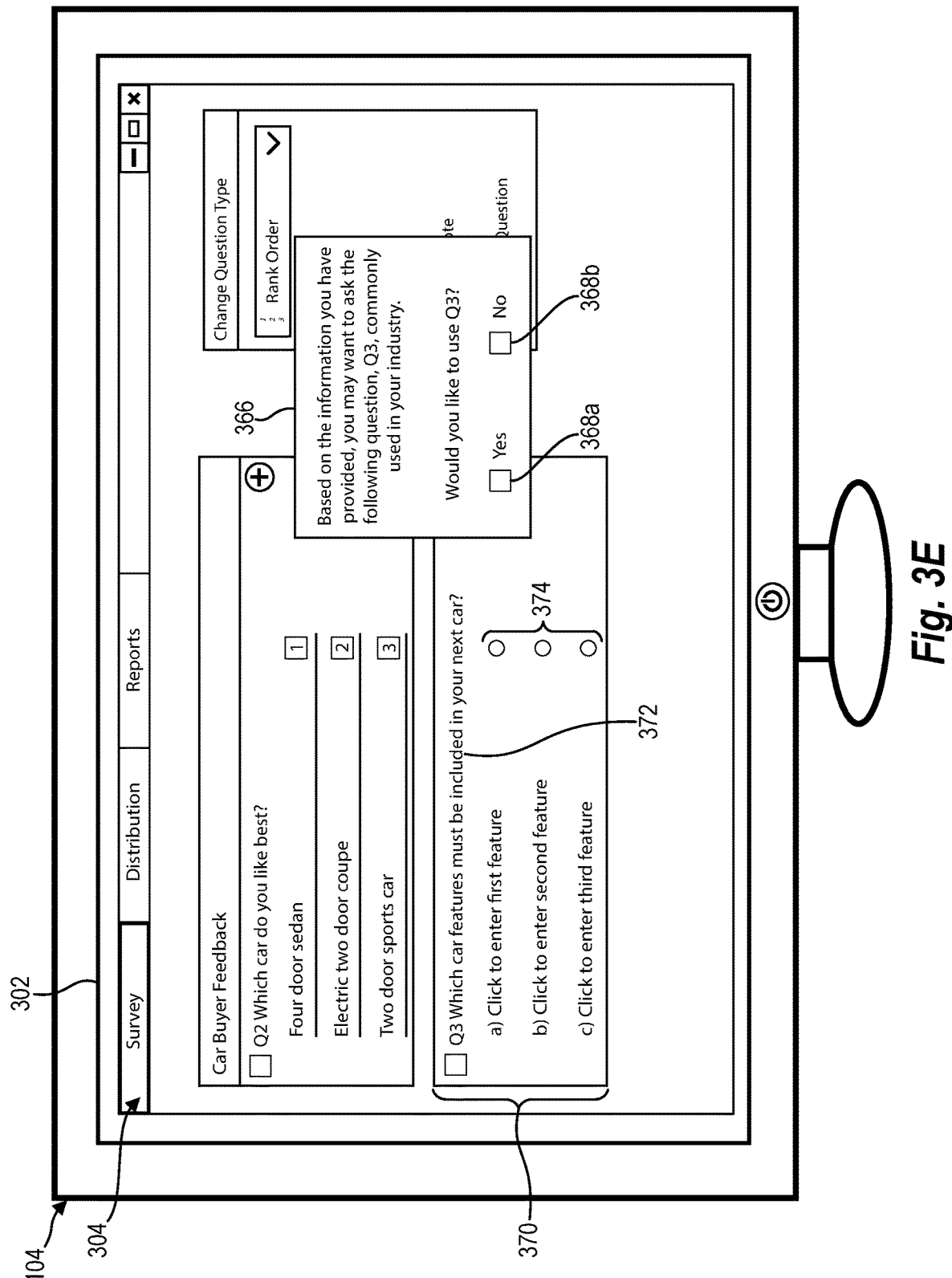

For example, FIG. 3E illustrates an example of the electronic survey system 118 providing a suggested question portion of an electronic survey question 372. For example, and consistent with the principles and examples discussed above with respect to identifying a suggested electronic survey question, the electronic survey system 118 can conduct analysis on the content of the suggested electronic survey question Q1 (which the survey administrator 102 accepted), the electronic survey question Q2 (which the survey administrator 102 composed), the user input entered by the survey administrator 102 within entry fields 312-320, and/or other information related to a survey administrator. Based on the analysis, the electronic survey system 118 can identify a suggested question portion to provide for presentation to a survey administrator via the graphical user interface 304. For example, and as shown in FIG. 3E, the electronic survey system can provide a question suggestion notice 366, a corresponding question block 370, the suggested question portion 372, and a placeholder answer portion 374. Accordingly, the electronic survey system 118 can provide a question suggestion notice and/or contents of a suggested question portion of an electronic survey question as part of providing guidance to a survey administrator.

Some embodiments of the electronic survey system 118 provide an option to accept or reject a suggested electronic survey question, including a suggested portion of an electronic survey question. As shown in FIG. 3E, for example, the question suggestion notice 366 includes a selectable accept option 368*a* (e.g., "Yes") and a selectable reject option 368*b* (e.g., "No") that enable the survey administrator 102 to accept or reject the suggested electronic survey question Q3, respectively, including the suggested question portion 372 and the placeholder answer portion 374. If the survey administrator 102 accepts Q3 by selecting "Yes," the electronic survey system 118 will update the graphical user interface 304 to remove the question suggestion notice 366 and to include a question type menu corresponding to Q3 with options and tools to modify Q3. If the survey administrator 102 rejects Q3 by selecting "No," however, the electronic survey system 118 will update the graphical user interface 304 to remove the question suggestion notice 366 and the question block 370.

Figure 4A:
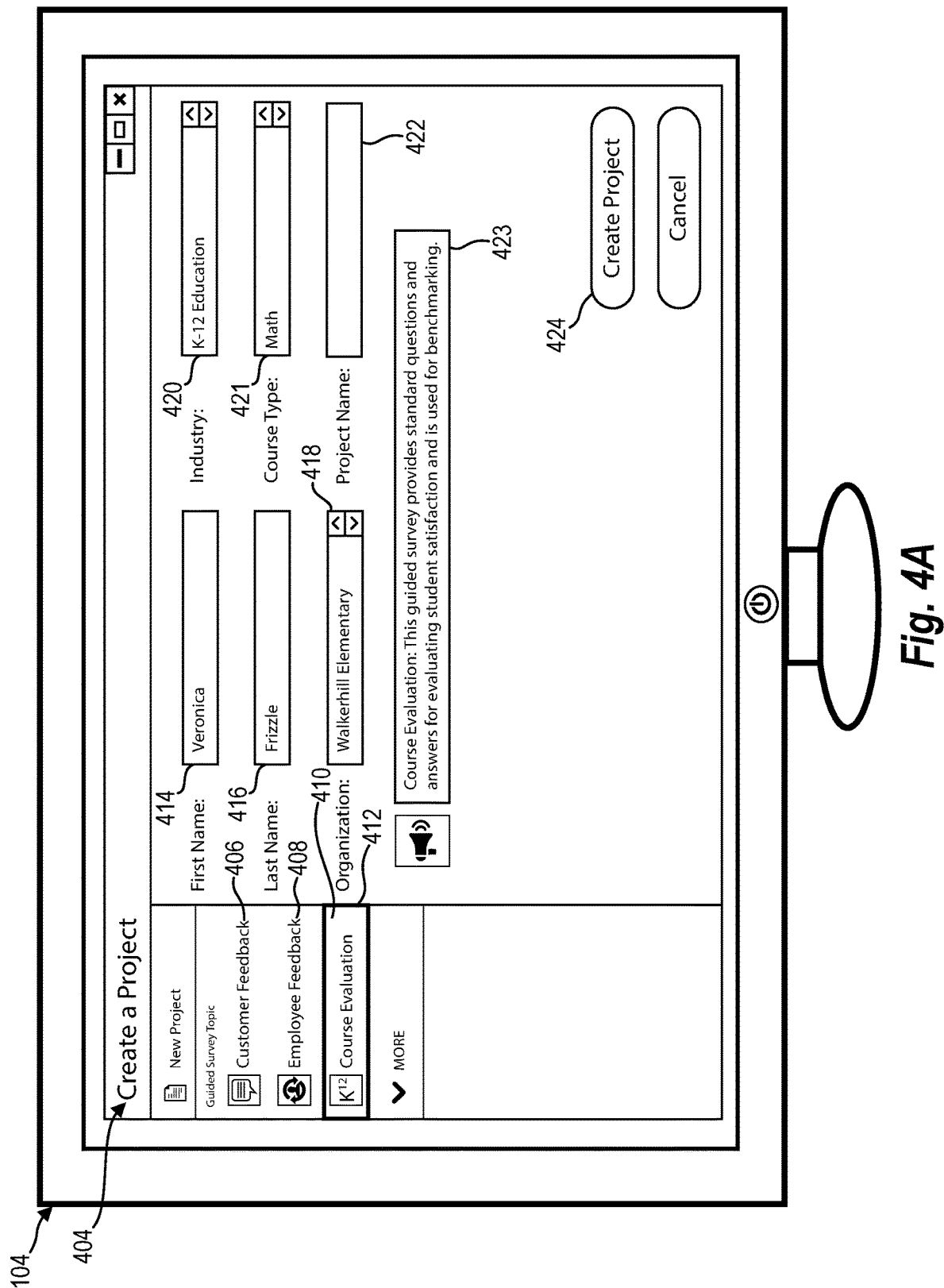
FIGS. 4A-4C illustrate a graphical user interface showing a plurality of views of a guided electronic survey creation process in accordance with one or more embodiments.
Figure 4B:
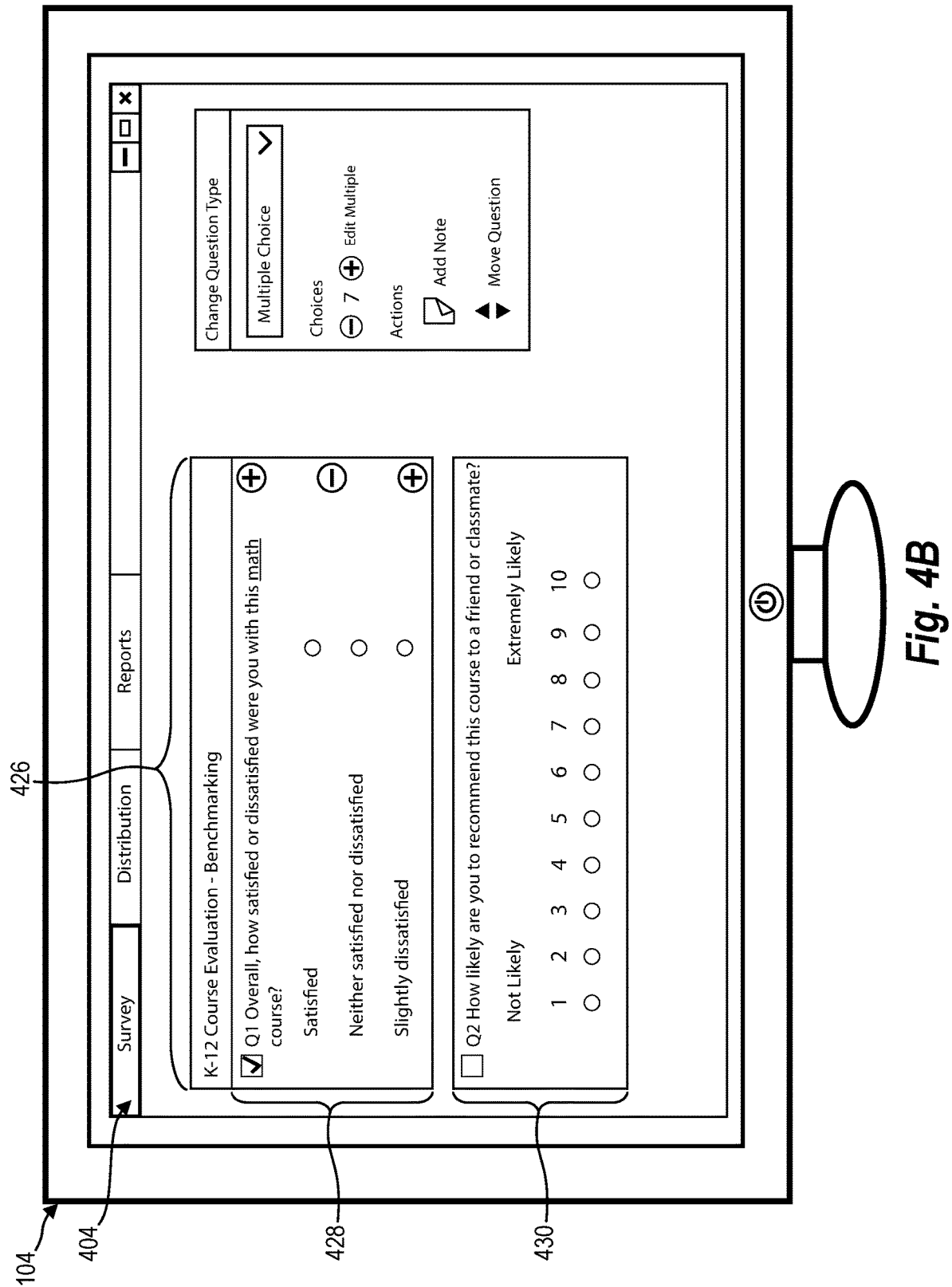
Figure 4C:
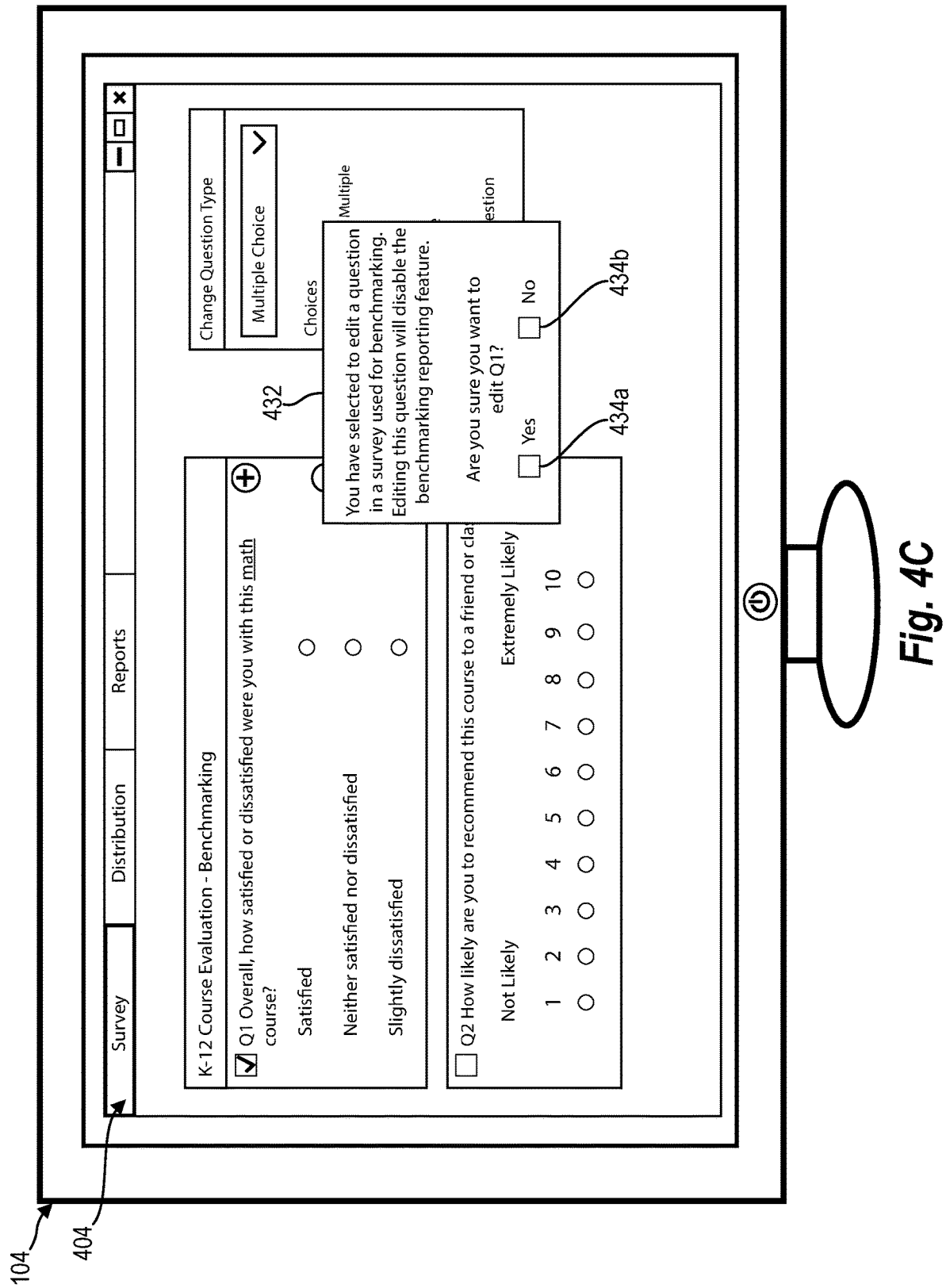

Turning now to FIGS. 4A-4C, and as mentioned above, some embodiments of the electronic survey system 118 provide guidance to create an electronic survey (or electronic survey question) that can be used for benchmarking. As used in this disclosure, the term "benchmarking" refers to the practice of evaluating survey responses by comparing responses to a standard survey or a standard survey question containing content that remains consistent over time (e.g., the same content or only inconsequential variations). For example, a survey administrator may administer a benchmarking electronic survey—with multiple benchmarking electronic survey questions—to evaluate responses benchmark responses, that is, by comparing responses to the benchmarking electronic survey questions to prior responses received for the same benchmarking question.

To facilitate creating an electronic survey for benchmarking, some embodiments of the electronic survey system 118 provide one or more suggested survey topics or one or more suggested electronic survey questions for benchmarking. In some embodiments, such as those illustrated by FIGS. 4A-4C, the suggested survey topics and suggested electronic survey questions come in the form of selectable options. For example, FIG. 4A illustrates a graphical user interface 404 showing a suggested survey topic option provided by the electronic survey system 118 for benchmarking, along with other survey topic options. Specifically, the electronic survey system 118 has provided a customer feedback topic option 406, an employee feedback topic option 408, and a course evaluation topic option 410. For instance, and based on the above discussed principles, the course evaluation topic option 410 represents a survey topic option provided by the electronic survey system 118 for benchmarking based on user input or other information associated with the survey administrator.

To provide notice that the course evaluation topic option 410 is associated with benchmarking, the electronic survey system 118 provides an indication of benchmarking via the graphical user interface 404. In particular, the electronic survey system 118 can provide a suggested survey topic description 423 that indicates the positional for creating a benchmarking survey, as illustrated in FIG. 4A. For example, the suggested survey topic description 423 includes a brief synopsis of the information an electronic survey covering a "course evaluation" survey topic is intended to gather and indicates that the course evaluation topic option 410 produces standard electronic survey questions used for benchmarking.

To facilitate creating an electronic survey for benchmarking, the electronic survey system 118 provides a create project option 424. Upon the electronic survey system 118 receiving an indication of a selection of the create project option 424, the electronic survey system 118 identifies one or more suggested electronic survey questions to include within a corresponding electronic survey template, similar to the detail described above with respect to FIGS. 3B-3C. In this example, when the survey administrator 102 selects the course evaluation topic option 410 and the create project option 424, the electronic survey system 118 creates an electronic survey template that provides suggested standard electronic survey questions for benchmarking a course evaluation within the electronic survey template, as described further below.

Turning now to FIG. 4B, as noted above, some embodiments of the electronic survey system 118 provide multiple suggested electronic survey questions at a time, such as providing multiple suggested electronic survey questions within a single electronic survey template. In some embodiments, the multiple electronic survey questions include benchmarking electronic survey questions. For example, the electronic survey system 118 may associate a set of 20 benchmarking electronic survey questions corresponding to a particular survey topic option. As illustrated in FIG. 4B, for example, the electronic survey system 118 provides multiple benchmarking electronic survey questions associated with the course evaluation topic option 410, including an electronic survey question Q1 (shown within a question block 428) and an electronic survey question Q2 (shown within a question block 430). By providing the benchmarking electronic survey questions when any survey administrator selects the course evaluation topic option 410, the electronic survey system 118 facilitates benchmarking—that is, the survey administrator 102 can administer the standard electronic survey questions by distributing a course evaluation electronic survey, and the electronic survey system can generate a report comparing those responses to responses of previously administered course evaluation surveys that used the same benchmarking question.

As further illustrated in FIG. 4B, some embodiments of the electronic survey system 118 replace one or more components of an electronic survey question with one or more components of a user input. For example, the electronic survey system 118 may replace a component of an electronic survey question, such as a placeholder, with a component of user input representing, such as an organization name, an industry, a customer type, a customer name, a market description, a geographic location, a course type, a component of profile information, or any other information received by user input. Rather than a placeholder, the replaceable component of the electronic survey question may likewise be information corresponding to a component of the user input, such as a corresponding organization name, a corresponding industry, a corresponding customer type, a corresponding customer name, a corresponding market description, a corresponding geographic location, a corresponding course type, or a corresponding component of profile information.

As shown in FIG. 4B, for example, the electronic survey system 118 inserts one component of user input from the course type entry field 421 to a corresponding replacement component of the suggested electronic survey question Q1. In particular, and as stored in the database of categorized electronic survey questions, Q1 contains a placeholder for a course type. Within that database, for example, the text of Q1 may ask, "Overall, how satisfied or dissatisfied were you with this [course type] course?" The electronic survey system 118 identifies the user input within course type entry field 421 and a corresponding placeholder within Q1 and then automatically replaces the placeholder with the user input from within the course type entry field 421. As a result, and as shown in the question block 428 of FIG. 4B, the electronic survey system 118 provides a suggested benchmarking question that states: "Overall, how satisfied or dissatisfied were you with this math course?" Although FIG. 4B illustrates an embodiment of the electronic survey system 118 that replaces one component of an electronic survey question with a corresponding component of user input, certain embodiments of the electronic survey system 118 replace multiple components of an electronic survey question with multiple corresponding components of user input, as well as multiple components of electronic survey questions with multiple corresponding components of user input.

In addition to customizing a benchmarking electronic survey question using placeholders and previously provided user input, some embodiments of the electronic survey system 118 provide options for a survey administrator to modify benchmarking electronic survey questions or prohibit a survey administrator from modifying standard electronic survey questions. In some embodiments that provide modification options, the electronic survey system 118 also provides a warning message—upon receiving a request to edit a standard electronic survey question—that indicates that editing a standard electronic survey question will remove certain reporting features (e.g., benchmarking report features). In some embodiments that prohibit modification, the electronic survey system 118 also provides a message— upon receiving a request to edit a standard electronic survey question—explaining that the content of the standard electronic survey question may not be edited.

As shown in FIG. 4C, for example, after receiving a request from the administrator client device 104 to edit Q1, the electronic survey system 118 provides, via the graphical user interface 404, an edit warning message 432 that warns of possible consequences of editing a benchmarking electronic survey question. The edit warning message 432 includes a selectable accept option 434*a* and a selectable reject option 434*b* that enable the survey administrator 102 to proceed with the edit request or cancel the edit request, respectively. In some instances, the electronic survey system 118 provides the suggested electronic survey question or the option to add an electronic survey question within an electronic survey template as an alternative to editing the benchmarking electronic survey question.

In some embodiments that prohibit modifying a benchmarking electronic survey question, the electronic survey system 118 prohibits modifying only some benchmarking electronic survey questions (and not others) depending on the electronic survey question or electronic survey. For example, the electronic survey system 118 may prohibit modifying benchmarking electronic survey questions within an electronic survey that includes copyrighted content.

In addition to providing multiple suggested electronic survey questions within a single electronic survey template—and providing options to modify the questions— some embodiments of the electronic survey system 118 provide multiple suggested electronic survey topics. For example, in some embodiments, the electronic survey system 118 provides multiple suggested electronic survey topics and options to create an electronic survey corresponding to each suggested electronic survey topic. To facilitate creating such electronic surveys, some embodiments of the electronic survey system 118 may provide multiple suggested electronic survey topics related to a broader topic and an option to create each of the multiple suggested electronic surveys (e.g., by providing suggested electronic survey topics for a student orientation evaluation, a mid-year student evaluation, and an end-of-year student evaluation, and providing an option to create an electronic survey for each of the three types of student evaluations).

Figure 5:
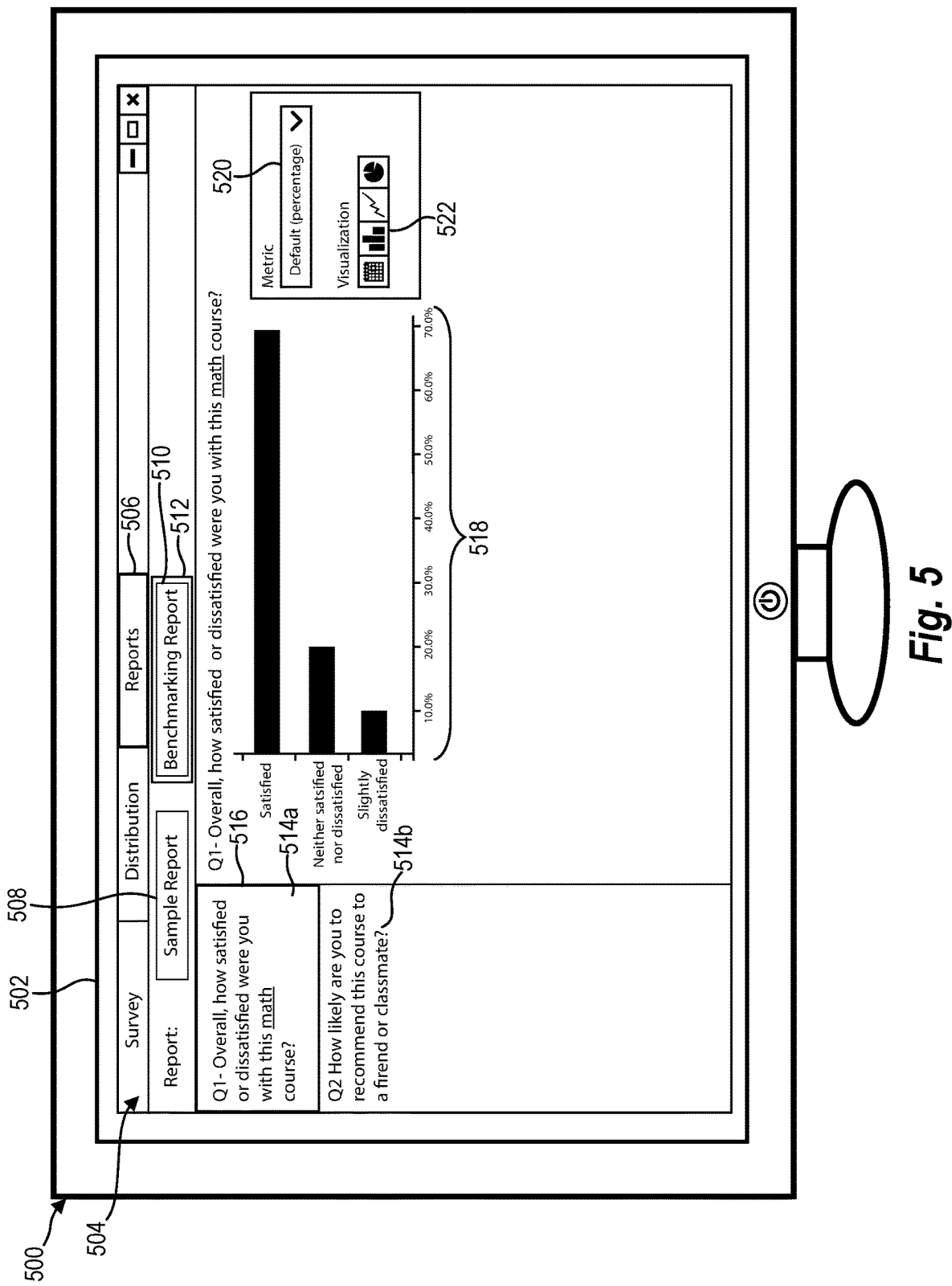
FIG. 5 illustrates a graphical user interface showing a report preview in accordance with one or more embodiments.

Turning now to FIG. 5, certain embodiments of the electronic survey system 118 provide a preview of a survey response report for an electronic survey. The term "survey response report" refers to a report showing data representing responses to an electronic survey, such as response rates to an electronic survey or data representing responses to one or more electronic survey questions of an electronic survey. For example, a survey response report may include a graphical report showing data representing responses to an electronic survey question in terms of percentages, response count by answer, median response, or in terms of some of response metric.

In addition, the term "preview" of a survey response report refers to an example survey response report that demonstrates the appearance and features of a survey response report prior to receiving actual response data (e.g., prior to administering an electronic survey). In some embodiments, the electronic survey system 118 provides a preview of a survey response report based on sample data that the system 118 generates to imitate or represent future response data to an electronic survey question, such as a preview of a survey response report based on dummy data. In other embodiments, the electronic survey system 118 provides a preview of a survey response report based on actual response data to a similar and previously administered electronic survey question.

As shown in FIG. 5, the electronic survey system 118 can provide a preview of a survey response report preview 500 on a graphical user interface 504 displayed within a screen 502. Specifically, FIG. 5 illustrates the survey response report preview 500 showing benchmarking response data for the benchmarking electronic survey question Q1 from FIG. 4B. In this embodiment, based on the survey administrator 102 selecting a selectable report tab 506, the electronic survey system 118 provides for display the survey response report preview 500 on the graphical user interface 504.

As also shown in FIG. 5, the survey response report preview 500 includes a selectable sample report option 508, a selectable benchmarking report option 510, and a report type indicator 512. The electronic survey system 118 provides both the selectable sample report option 508 and the selectable benchmarking report option 510 to facilitate the display and comparison of different types of response data. When the survey administrator 102 selects (and the report type indicator 512 surrounds) the selectable benchmarking report option 510, the electronic survey system 118 displays actual response data to previously administered electronic surveys using the same benchmarking survey question within the survey response report preview 500. In a similar manner, when the survey administrator 102 selects (and the report type indicator 512 surrounds) the selectable sample report option 508, for example, the electronic survey system 118 displays sample response data for an electronic survey that replicates actual response data within the survey response report preview 500 (e.g., based on user inputs such as geographic location, industry, organization).

Additionally, in some embodiments, the electronic survey system 118 provides an actual survey response report after the system 118 has received responses to an electronic survey. In some such embodiments, the electronic survey system 118 provides an option to view actual response data for a particular electronic survey and actual response data to other electronic surveys using the same standard electronic survey questions for benchmarking within the same graphical user interface, such as in a split-screen comparison. This particular embodiment facilitates viewing two different response data sets within one interface.

In the embodiment shown in FIG. 5, the survey response report preview 500 includes a response graph 518 for one electronic survey question, Q1. FIG. 5 further illustrates a first electronic survey question thumbnail 514a for Q1, a second electronic survey question thumbnail 514b for Q2, and a question number indicator 516. Both the first electronic survey question thumbnail 514a and the second electronic survey question thumbnail 514b include the full text of Q1 and Q2, respectively. The question number indicator 516 indicates which electronic survey question thumbnail corresponds to the response graph 518. As shown in FIG. 5, the question number indicator 516 surrounds the first electronic survey question thumbnail 514a and thereby indicates that the response graph 518 shows response data for Q1. In this embodiment, the response graph 518 shows actual response data to other electronic surveys using Q1 for benchmarking.

Some embodiments of the electronic survey system 118 determine a metric and a format for response data to display within a preview of a survey response report or within an actual survey response report. As shown in FIG. 5, for example, the electronic survey system 118 has identified Q1 as a multiple choice type question. Based on identifying Q1 as a multiple choice type question, the electronic survey system 118 determines to display response data to Q1 within the response graph 518 in terms of response percentages (as a default metric) and in a bar-chart format (as a default format). In some embodiments, the electronic survey system 118 determines a metric (e.g., response percentage, response mean) or format based on the metrics or format of survey response reports for other electronic surveys (e.g., survey response reports for other electronic surveys using the same or similar benchmarking electronic survey questions).

As noted above, and as illustrated in FIG. 6, certain embodiments of the electronic survey system 118 identify and provide suggested options to distribute an electronic survey. In some instances, the electronic survey system 118 identifies and provides a suggested option to distribute an electronic survey based on user input or information from the administrator client device 104, such as information concerning an organization, an industry, market, customers, profile, demographics of potential survey respondents, geographic location of potential survey respondents, geographic location of a survey administrator, or other information. Additionally, or in the alternative, certain embodiments of the electronic survey system 118 identify and provide a suggested option to distribute an electronic survey based on a survey topic, electronic survey question, benchmarking options, or other information entered or selected by a survey administrator. In some instances, the electronic survey system 118 identifies a suggested option to distribute an electronic survey based on data associated with an electronic survey in combination with user input, such as data representing response rates, response counts, or statistical significance scores (e.g., Z scores, p-values).

To facilitate identifying suggested distribution options, certain embodiments of the electronic survey system 118 maintain a database of categorized distribution methods. The database of categorized distribution methods includes distributed electronic surveys categorized by various data tags, such as data tags for distribution methods, including, but not limited to, data tags corresponding to emails sent through the electronic survey system 118, emails sent through an external email service, a link embedded within one or more websites, a post on one or more social networks, a Short Message Service ("SMS") text, a mobile application, or a scan of a Quick Response ("QR") code. In some embodiments, the data tags in the database of categorized distribution methods include each data category or data tag described above, including, but not limited to, data categories or data tags corresponding to survey topics, electronic survey questions, organizations, industries, geographic locations, markets, customers, profile information, or demographic information. Additionally, some embodiments of the electronic survey system 118 associate certain data with distributed electronic surveys within the database of distribution methods, such as response rates, response counts, or statistical significance scores (e.g., Z scores, p-values).

To identify a suggested distribution method, some embodiments of the electronic survey system 118 rank distribution methods based on data categories, data tags, associated data, or a combination of some or all of data categories, data tags, or associated data within the database of categorized distribution methods. For example, the electronic survey system 118 assigns points, assigns coefficients, scores, and ranks distribution methods according to a distribution method's association with data categories corresponding to user input of a survey administrator and identifies as suggested distribution methods one or more distribution methods that have the highest scores above a threshold. Based on identifying one or more suggested distribution methods, some embodiments of the electronic survey system 118 provide one or more corresponding options to distribute an electronic survey.

The foregoing example sets forth merely one embodiment of how the electronic survey system 118 identifies suggested distribution methods. Other ways of identifying suggested distribution methods include different methods of assigning points (e.g., assigning points to distribution methods associated with data tags that do not correspond to user input, assigning points to distribution methods used by survey administrators within the same organization or same industry or with the same customer type), assigning coefficients (e.g., assigning a coefficient based on the number of instances an electronic survey within the database of categorized distribution methods has been distributed through a particular distribution method, assigning a coefficient based on the number of data tags associated with a distribution method, assigning a coefficient to distribution methods used by survey administrators within the same organization or same industry or with the same customer type), and ranking (e.g., ranking distribution methods by inverse score, median score, or mean score).

Turning back to FIG. 6, this disclosure will use a couple distribution methods illustrated by FIG. 6 in an example of how the electronic survey system 118 identifies suggested distribution methods and provides suggested distribution options. In this example, the electronic survey system 118 assigns 10.0 points to a data tag associated with a distribution method of emailing through the electronic survey system 118 ("system email distribution method") and 5.0 points to a data tag associated with a distribution method of emailing through an external email service ("external email distribution method"). The electronic survey system 118 assigns the points in this example because the system 118 identifies that twice as many distributed electronic surveys—that are within the database of categorized distribution methods, associated with a "course evaluation" survey topic, and associated with the standard electronic survey questions shown in FIG. 4B—have been emailed through the electronic survey system 118 than distributed electronic surveys emailed through an external email service. Additionally, the electronic survey system 118 assigns a coefficient of 0.85 to the system email distribution method and a coefficient of 0.75 to the external email distribution method. The electronic survey system 118 assigns the coefficients in this example because the system 118 identifies that a mean of 85.0% of survey respondents responded to an electronic survey containing the same standard electronic survey questions when distributed through the system email distribution method and that a mean of 75.0% of survey respondents responded to an electronic survey containing the same standard electronic survey questions when distributed through the external email distribution method.

Continuing the example from above, the electronic survey system 118 ranks the system email distribution method as first (with a score of 8.50) and the external email distribution method as second (with a score of 3.75). If the survey administrator 102 had identified a threshold score of 5.00 for suggested distribution methods, for example, the electronic survey system 118 would identify the system email distribution method as a suggested distribution method, but would not identify the external email distribution method as a suggested distribution method. The electronic survey system 118 could likewise score and rank each distribution method using a similar scoring and ranking process.

Figure 6:
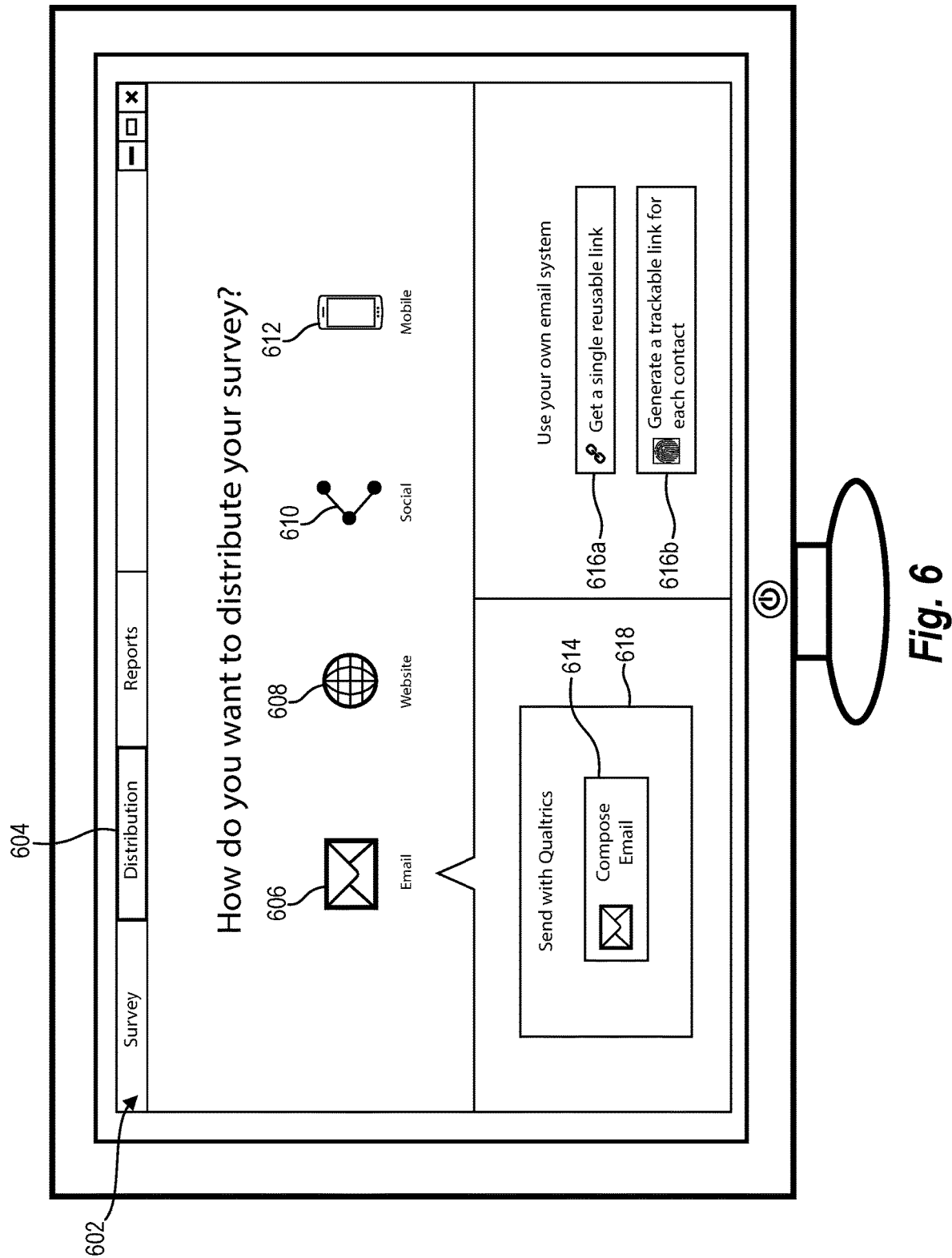
FIG. 6 illustrates a graphical user interface showing electronic survey distribution options in accordance with one or more embodiments.

Consistent with the analysis above, FIG. 6 illustrates a graphical user interface 602 showing distribution options within a distribution tab 604, including a suggested distribution option. When the electronic survey system 118 receives an indication of a selection of the distribution tab 604, the electronic survey system 118 provides for presentation on the graphical user interface 602 several distribution options, including an email distribution option 606, a website distribution option 608, a social network distribution option 610, and a mobile device distribution option 612. The electronic survey system 118 further provides distribution suboptions corresponding to each of the distribution options 606-612.

FIG. 6 illustrates three such distribution suboptions—a system email distribution suboption 614, an external email distribution suboption 616a, and an external email distribution suboption 616b. As explained further below, when the electronic survey system 118 receives an indication of a selection of the system email distribution suboption 614, the external email distribution suboption 616a, or the external email distribution suboption 616b, the electronic survey system 118 provides templates or links to distribute an electronic survey through emails sent by the electronic survey system 118, emails sent by an external email system using a single reusable link, or emails sent by an external email system using a trackable link for each contact, respectively. Based on identifying the system email distribution method as a suggested distribution method, however, the electronic survey system 118 provides for presentation within the graphical user interface 602 a suggested distribution indicator 618 surrounding the system email distribution suboption 614. The suggested distribution indicator 618 identifies the highest ranking distribution suboption corresponding to the suggested distribution method with a box surrounding the system email distribution suboption 614.

As noted above, some embodiments of the electronic survey system 118 provide distribution suboptions corresponding to each of the distribution options 606-612. In such embodiments, the electronic survey system 118 provides for presentation on the graphical user interface 602 a set of distribution suboptions in response to receiving an indication of a selection—from the administrator client device 104—of one of the corresponding distribution options 606-612. For example, the email distribution option 606—when selected—triggers the display of the system email distribution suboption 614, the external email distribution suboption 616a, and the external email distribution suboption 616b. The website distribution option 608—when selected—triggers a display of a suboption to embed a survey link on a website and a suboption to create a site intercept on a website (e.g., a pop-up window that includes a link to an electronic survey and that is generated by the electronic survey system 118 in response to a request by the respondent client device 110 to access a website). The social network distribution option 610—when selected—triggers a display of a suboption to post an electronic survey on a profile or social feed of a social networking system and a suboption to post an electronic survey on a profile or social feed of another social networking system. Finally, the mobile device distribution option 612—when selected—triggers a display of a suboption to send an electronic survey through an SMS text, a suboption to distribute an electronic survey to a mobile application, and a suboption to generate an electronic survey on a website in response to a mobile device scanning a QR code.

Once a survey administrator selects one or more distribution options, the electronic survey system 118 can coordinate survey administration and distribute an electronic survey. When the electronic survey system 118 receives an indication of a selection of the distribution options described in the preceding paragraph, the system 118 provides templates or links or otherwise facilitates the distribution of an electronic survey according to the selected distribution methods to one or more recipients.

In addition to providing distribution options for a single electronic survey, some embodiments of the electronic survey system 118 provide an option to create and distribute multiple electronic surveys according to a schedule. In some such embodiments, the electronic survey system 118 provides multiple suggested survey topics related to a broader topic—as described above—along with a suggested schedule for distributing corresponding electronic surveys. For example, in some embodiments, the electronic survey system 118 provides multiple suggested survey topics related to employee feedback and options to both create an electronic survey corresponding to each suggested survey topic and distribute the created electronic surveys according to a suggested schedule (e.g., options to create and distribute a new hire survey at the time of hiring, a follow-up survey 90 days after the time of hiring, an annual employee review survey at the end of a fiscal year, and an exit survey at the time of departure). In some such embodiments, the electronic survey system 118 provides a suggested schedule for each of the electronic surveys corresponding to each suggested survey topic and a single batch option to distribute the created electronic surveys according to the suggested schedule.

Figure 7:
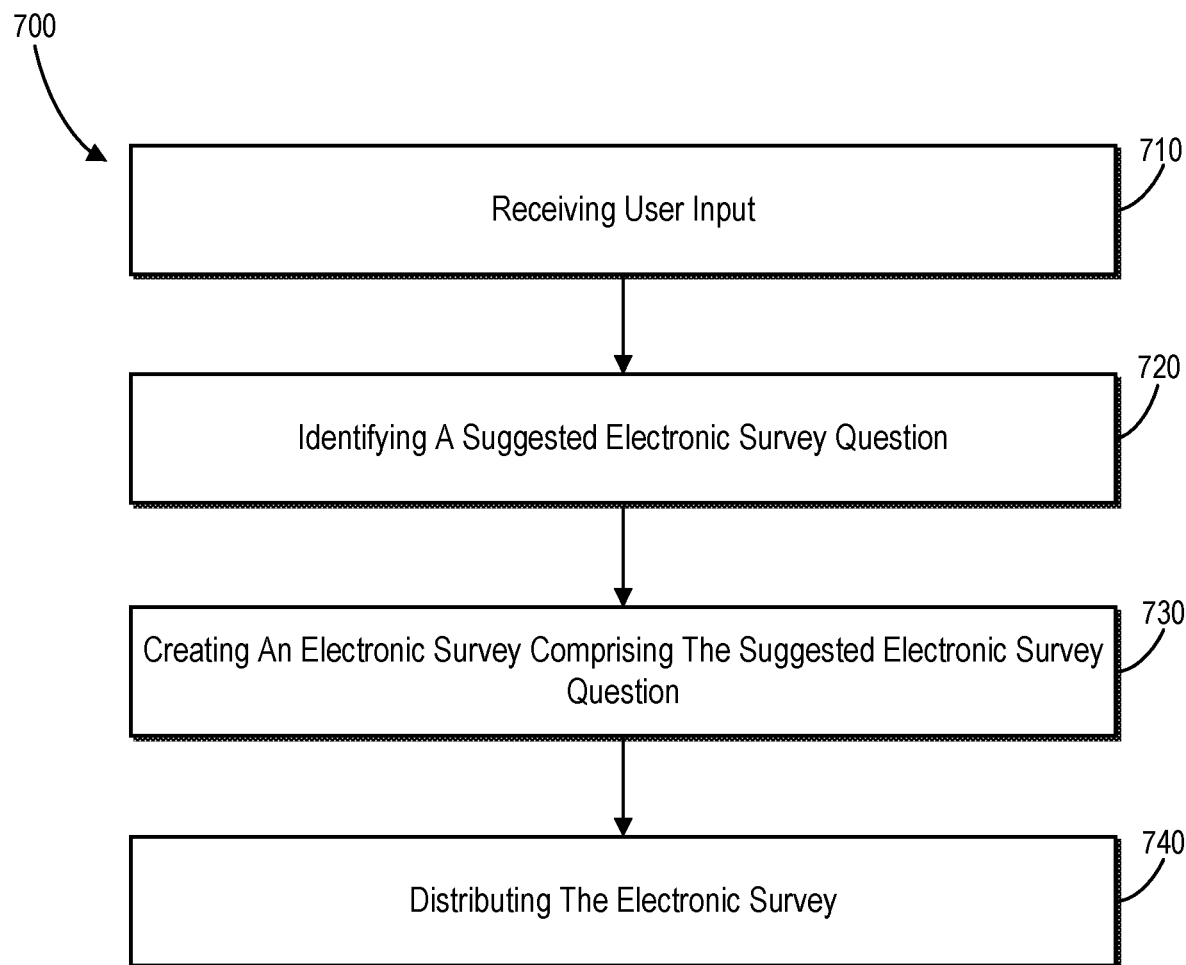
FIG. 7 illustrates a flowchart of a series of acts in a method for providing guidance to create an electronic survey in accordance with one or more embodiments.

Turning now to FIG. 7, this figure illustrates a flowchart of a series of acts in a method 700 of providing guidance to create an electronic survey in accordance with one or more embodiments of the electronic survey system 118. While FIG. 7 illustrates exemplary acts according to one embodiment, alternative embodiments may omit, add to, reorder, and/or modify any of the steps shown in FIG. 7. Further, the administrator client device 104, the electronic survey system 118, or a combination of both, may perform one or more of the acts of the method 700.

As shown in FIG. 7, the method 700 includes an act 710 of receiving user input. In particular, the act 710 can include receiving from an administrator client device user input at one or more servers that provide an electronic survey service. In one or more embodiments, the user input comprises an input identifying profile information, an occupation, an industry, a metric for measurement, a survey topic, or an organization.

As illustrated in FIG. 7, the method 700 includes an act 720 of identifying a suggested electronic survey question. In particular, the act 720 can include, based on the user input, identifying, by the one or more servers, a suggested electronic survey question. For example, in one or more embodiments, identifying the suggested electronic survey question comprises: based on the user input, identifying, by the one or more servers, electronic survey data associated with the user input; and based on the electronic survey data associated with the user input, creating, by the one or more servers, the suggested electronic survey question. Additionally, in one or more embodiments, the electronic survey data associated with the user input comprises a plurality of previously composed electronic survey questions.

As another example, in one or more embodiments, identifying the suggested electronic survey question comprises: accessing a plurality of previously composed electronic survey questions and identifying a previously composed electronic survey question from the plurality of previously composed electronic survey questions based on determining that the user input corresponds to the previously composed electronic survey question.

Additionally, in one or more embodiments, the method 700 also includes modifying the content from the previously composed electronic survey question, wherein generating the suggested electronic survey using the content from the previously composed electronic survey question comprises using the modified content from the previously composed electronic survey question. Moreover, in one or more embodiments of method 700, the previously composed electronic survey question from the plurality of previously composed electronic survey questions comprises a benchmark survey question to be used to generate a benchmark report feature.

As also illustrated in FIG. 7, the method 700 includes an act 730 creating an electronic survey comprising the suggested electronic survey question. In particular, the act 730 can include creating, by the one or more servers, an electronic survey comprising the suggested electronic survey question. As also illustrated in FIG. 7, the method 700 includes an act 740 of distributing the electronic survey. In particular, the act 740 can include distributing, by the one or more servers via a network, the electronic survey to one or more respondent client devices associated with one or more respondents. Relatedly, the act 740 can include generating the suggested electronic survey question using content from the previously composed electronic survey question.

Additionally, in one or more embodiments, the method 700 further includes identifying electronic survey data corresponding to the user input, wherein identifying the suggested electronic survey question is based on the electronic survey data corresponding to the user input. Relatedly, in one or more embodiments of the method 700, the electronic survey data corresponding to the user input comprises a plurality of previously composed electronic survey questions.

Moreover, some embodiments of method 700 enable modifying suggested electronic survey questions. For example, in some embodiments, the method 700 further includes receiving, from the administrator client device, a modification request to modify the benchmark survey question; and providing, to the administrator client device, a warning message indicating that modifying the benchmark survey question will remove the benchmark report feature, wherein the warning message comprises a first selectable option to proceed with the modification request and a second selectable option to cancel the modification request.

Some embodiments of the method 700 include a reporting feature. For example, in one or more embodiments, the method 700 further includes providing, by the one or more servers to the administrator client device, a preview of a survey response report presenting sample response data corresponding to one or more potential responses to the suggested electronic survey question. Relatedly, in one or more embodiments, the method 700 further includes generating the sample response data using a computer generated model that simulates one or more random responses to the one or more potential responses to the suggested electronic survey question. Additionally, in one or more embodiments, the method 700 further includes identifying, by the one or more servers, a question type of the suggested electronic survey question; and based on the identified question type, determining a report format in which to provide the preview of the survey response report.

Figure 8:
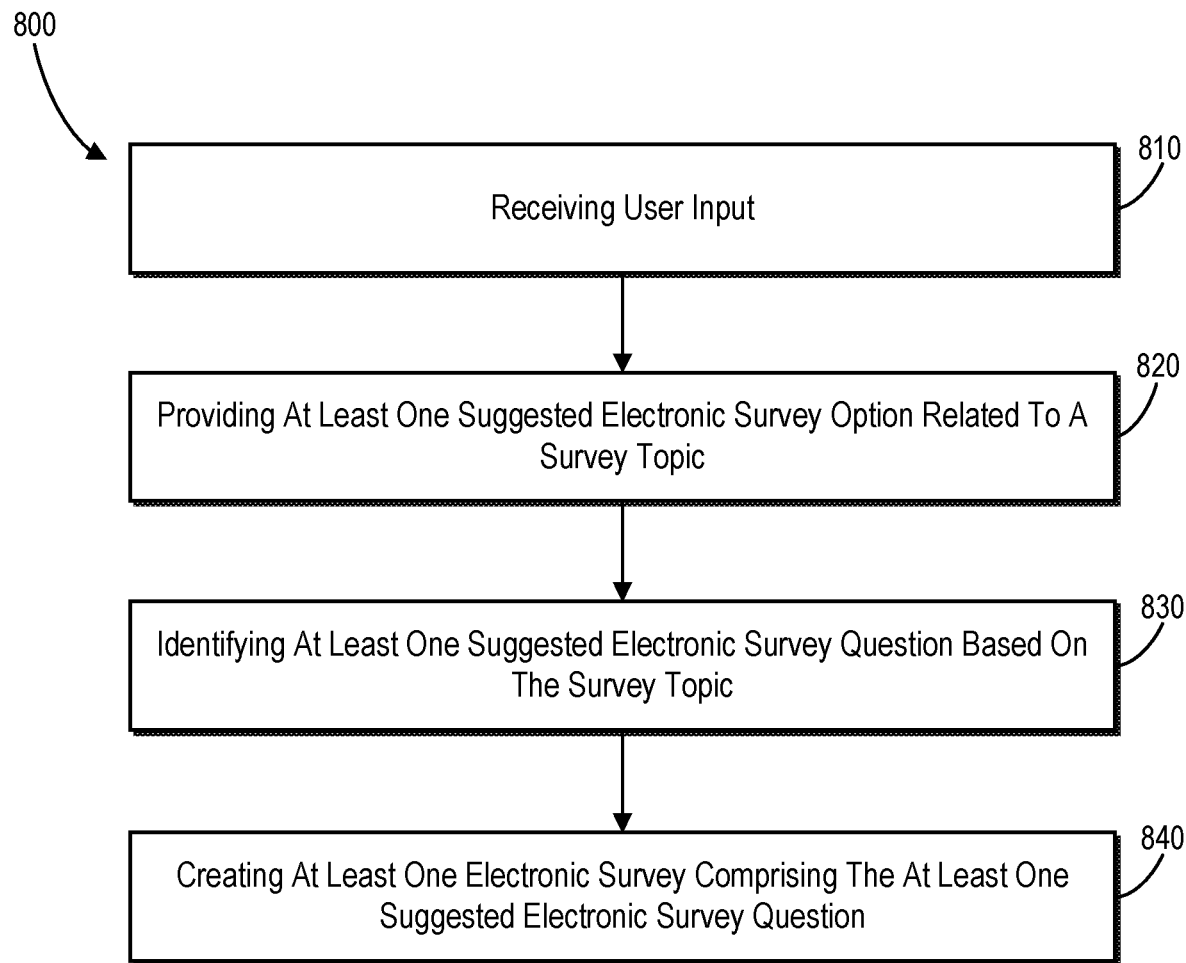
FIG. 8 illustrates a flowchart of a series of acts in a method for providing guidance to create an electronic survey in accordance with one or more embodiments.

FIG. 8 illustrates a flowchart of a series of acts in a method 800 of providing guidance to create an electronic survey in accordance with one or more embodiments of the electronic survey system 118. While FIG. 8 illustrates steps according to one embodiment, alternative embodiments may omit, add to, reorder, and/or modify any of the acts shown in FIG. 8. Further, the administrator client device 104, the electronic survey system 118, or a combination of both, may perform one or more acts of the method 800.

As shown in FIG. 8, the method 800 includes an act 810 of receiving user input. In particular, the act 810 can include receiving, at one or more servers that provide an electronic survey service, user input from an administrator client device. As also shown in FIG. 8, the method 800 includes an act 820 of providing at least one suggested electronic survey option related to a survey topic. In particular, the act 820 can include, based on the user input, providing, by the one or more servers, at least one suggested electronic survey option related to a survey topic. Alternatively, the act 820 can include providing a plurality of suggested electronic survey options related to the survey topic.

As also shown in FIG. 8, the method 800 includes an act 830 of identifying at least one suggested electronic survey question. In particular, the act 830 can include, based on receiving a selection of the at least one suggested electronic survey option, identifying, by the one or more servers, at least one suggested electronic survey question. In some embodiments, the act 830 can include identifying multiple suggested electronic survey questions based on receiving a selection of two or more suggested electronic survey options from the plurality of suggested electronic survey options.

Furthermore, the method 800 includes an act 840 of creating at least one electronic survey comprising the at least one suggested electronic survey question. In particular, the act 840 can include creating, by the one or more servers, at least one electronic survey comprising the at least one suggested electronic survey question. In some embodiments, the act 840 can include creating two or more electronic surveys, wherein each of the two or more electronic surveys comprises one or more of the identified multiple suggested electronic survey questions.

Some embodiments of the method 800 include a plurality of suggested electronic survey questions. For example, in one or more embodiments, the method 800 also includes, based on the user input, identifying a previously composed electronic survey question; and wherein the at least one suggested electronic survey question comprises the previously composed electronic survey question. Relatedly, in one or more embodiments, the method 800 also includes identifying, by the one or more servers, at least one component of the user input corresponding to at least one replaceable component of the plurality of previously composed electronic survey questions; and replacing the at least one replaceable component of the plurality of previously composed electronic survey questions with the at least one component of the user input. Relatedly, in one or more embodiments, the method 800 also includes preventing a user associated with the administrator client device from modifying content of the previously composed electronic survey questions.

Some embodiments of the method 800 also provide a distribution option. For example, in one or more embodiments, the method 800 also includes providing, to the administrator client device, a distribution option to distribute the at least one electronic survey, wherein the distribution option is based on the survey topic. Relatedly, the method 800 can also include providing a distribution option to distribute each of the two or more electronic surveys according to a suggested schedule.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), flash memory, phase-change memory ("PCM"), other types of memory, other optical disk storage, magnetic disk storage or other magnetic storage devices, or any other medium that can be used to store desired program code means in the form of computer-executable instructions or data structures and that can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links that can be used to carry desired program code means in the form of computer-executable instructions or data structures and that can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
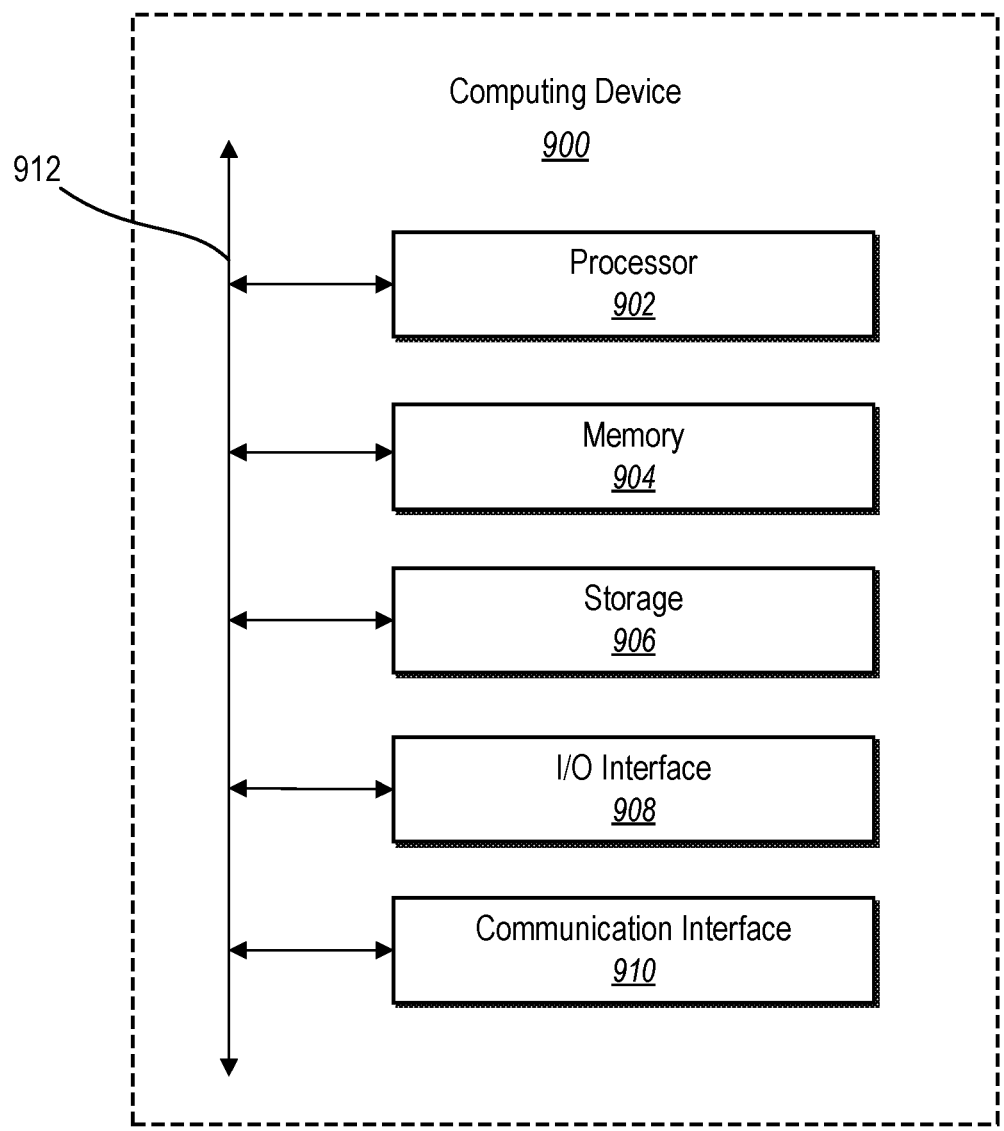
FIG. 9 illustrates a block diagram of a computing device in accordance with one or more embodiments.

FIG. 9 illustrates a block diagram of an exemplary computing device 900 that may be configured to perform one or more of the processes described above. One will appreciate that one or more computing devices such as the computing device 900 may implement the server device(s) 116 and/or other devices described above in connection with FIG. 1. As shown by FIG. 9, the computing device 900 can comprise a processor 902, a memory 904, a storage device 906, an I/O interface 908, and a communication interface 910, which may be communicatively coupled by way of a communication infrastructure 912. While the exemplary computing device 900 is shown in FIG. 9, the components illustrated in FIG. 9 are not intended to be limiting. Additional or alternative components may be used in other embodiments. Furthermore, in certain embodiments, the computing device 900 can include fewer components than those shown in FIG. 9. Components of the computing device 900 shown in FIG. 9 will now be described in additional detail.

In one or more embodiments, the processor 902 includes hardware for executing instructions, such as those making up a computer program. As an example and not by way of limitation, to execute instructions, the processor 902 may retrieve (or fetch) the instructions from an internal register, an internal cache, the memory 904, or the storage device 906 and decode and execute them. In one or more embodiments, the processor 902 may include one or more internal caches for data, instructions, or addresses. As an example and not by way of limitation, the processor 902 may include one or more instruction caches, one or more data caches, and one or more translation lookaside buffers (TLBs). Instructions in the instruction caches may be copies of instructions in the memory 904 or the storage device 906.

The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The storage device 906 includes storage for storing data or instructions. As an example and not by way of limitation, storage device 906 can comprise a non-transitory storage medium described above. The storage device 906 may include a hard disk drive (HDD), a floppy disk drive, flash memory, an optical disc, a magneto-optical disc, magnetic tape, or a Universal Serial Bus (USB) drive or a combination of two or more of these. The storage device 906 may include removable or non-removable (or fixed) media, where appropriate. The storage device 906 may be internal or external to the computing device 900. In one or more embodiments, the storage device 906 is non-volatile, solid-state memory. In other embodiments, the storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 908 allows a user to provide input to, receive output from, and otherwise transfer data to and receive data from the computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, the communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 912 may include hardware, software, or both that couples components of the computing device 900 to each other. As an example and not by way of limitation, the communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 10:
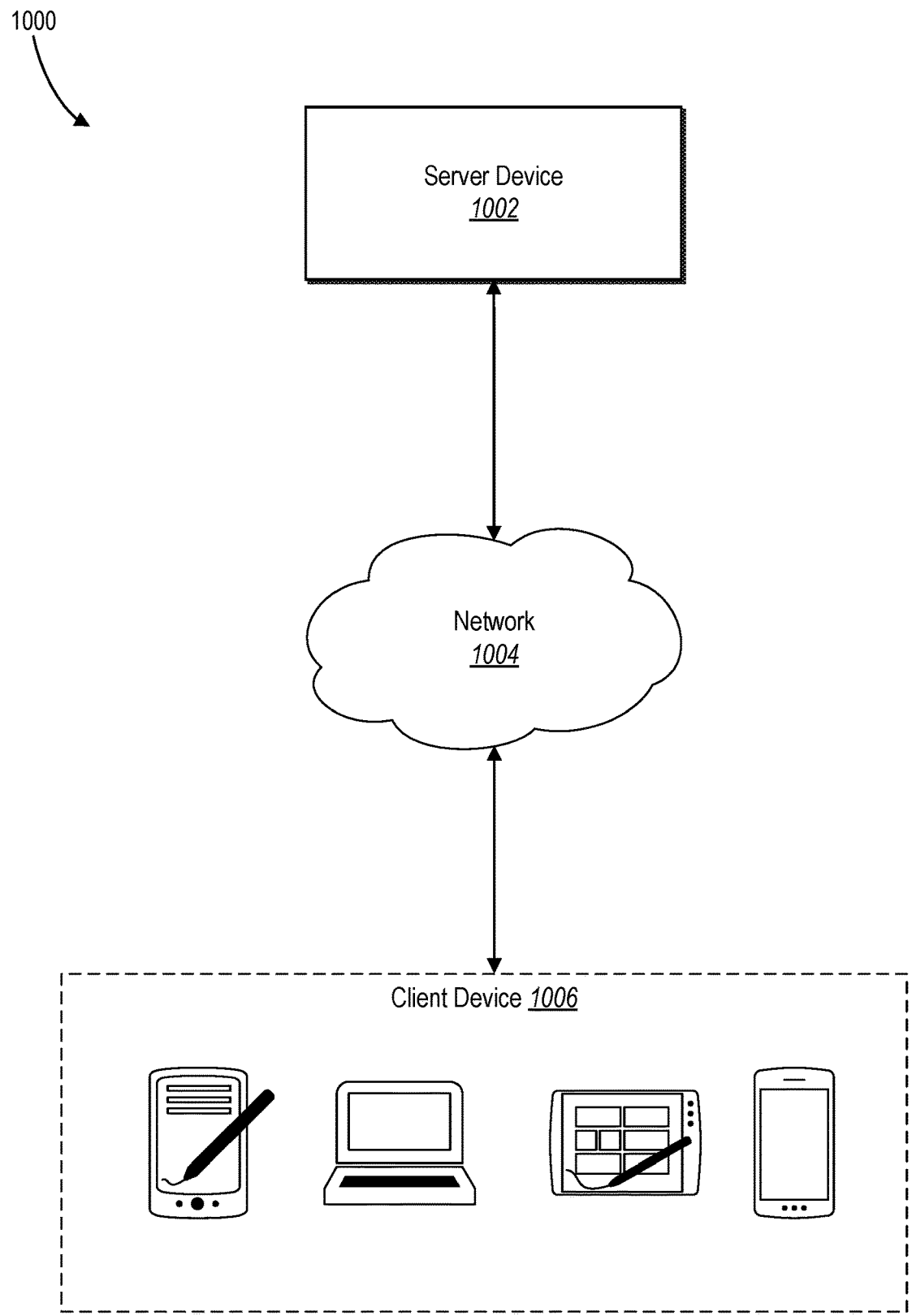
FIG. 10 illustrates a networking environment of an electronic survey composition system in accordance with one or more embodiments.

FIG. 10 illustrates an example network environment 1000 of the communication system 100. Network environment 1000 includes a client device 1006, and a server device 1002 connected to each other by a network 1004. Although FIG. 10 illustrates a particular arrangement of client system 1006, server device 1002, and network 1004, this disclosure contemplates any suitable arrangement of client device 1006, server device 1002, and network 1004. As an example and not by way of limitation, two or more of client device 1006, and server device 1002 may be connected to each other directly, bypassing network 1004. As another example, two or more of client device 1006 and server device 1002 may be physically or logically co-located with each other in whole, or in part. Moreover, although FIG. 10 illustrates a particular number of client devices 1006, server devices 1002, and networks 1004, this disclosure contemplates any suitable number of client devices 1006, server devices 1002, and networks 1004. As an example and not by way of limitation, network environment 1000 may include multiple client devices 1006, server devices 1002, and networks 1004.

This disclosure contemplates any suitable network 1004. As an example and not by way of limitation, one or more portions of network 1004 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1004 may include one or more networks 1004.

Links may connect client device 1006, and server device 1002 to communication network 1004 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1000. One or more first links may differ in one or more respects from one or more second links.

In particular embodiments, client device 1006 may be an electronic device including hardware, software, or embedded logic components or a combination of two or more such components and capable of carrying out the appropriate functionalities implemented or supported by client device 1006. As an example and not by way of limitation, a client device 1006 may include any of the computing devices discussed above in relation to FIG. 9. A client device 1006 may enable a network user at client device 1006 to access network 1004.

In particular embodiments, client device 1006 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client device 1006 may enter a Uniform Resource Locator (URL) or other address directing the web browser to a particular server (such as server, or a server associated with a third-party system), and the web browser may generate a Hyper Text Transfer Protocol (HTTP) request and communicate the HTTP request to server. The server may accept the HTTP request and communicate to client device 1006 one or more Hyper Text Markup Language (HTML) files responsive to the HTTP request. Client device 1006 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server device 1002 may include a variety of servers, sub-systems, programs, modules, logs, and data stores. In particular embodiments, server device 1002 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 1002 may also include suitable components such as network interfaces, security mechanisms, load balancers, failover servers, management-and-network-operations consoles, other suitable components, or any suitable combination thereof.

In particular embodiments, server device 1002 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. Additionally, a user profile may include financial and billing information of users (e.g., survey respondents 108, customers, etc.).

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method comprising:
    providing, by one or more servers that support an electronic survey service, a graphical user interface for presentation on an administrator client device, the graphical user interface comprising an electronic survey template for creating one or more electronic surveys;
    receiving, at the one or more servers, an electronic survey question based on user input entered within the electronic survey template;
    applying natural language processing to the electronic survey question to identify multiple negative words within the electronic survey question; and
    based on identifying the multiple negative words, providing, by the one or more servers for presentation within an updated graphical user interface, a suggested revision rephrasing the electronic survey question.

2. The method of claim 1, wherein the user input entered within the electronic survey template comprises input composing the electronic survey question within the electronic survey template or input importing the electronic survey question into the electronic survey template.

3. The method of claim 1, wherein the suggested revision rephrasing the electronic survey question removes a negative word of the multiple negative words.

4. The method of claim 1, wherein the suggested revision rephrasing the electronic survey question changes a negative word of the multiple negative words to a positive word.

5. The method of claim 1, wherein applying the natural language processing to the electronic survey question to identify multiple negative words comprises detecting one or more negative prefixes within the electronic survey question.

6. The method of claim 1, further comprising providing, to the administrator client device for presentation within the updated graphical user interface, a selectable option to accept the suggested revision rephrasing the electronic survey question.

7. The method of claim 1, further comprising providing, for presentation within the updated graphical user interface, a notification communicating that the electronic survey question is an unclear survey question.

8. A non-transitory computer readable storage medium storing instructions thereon that, when executed by at least one processor, cause a computer device to:
    provide, by one or more servers that support an electronic survey service, a graphical user interface for presentation on an administrator client device, the graphical user interface comprising an electronic survey template for creating one or more electronic surveys;
    receive, at the one or more servers, an electronic survey question based on user input entered within the electronic survey template;
    apply natural language processing to the electronic survey question to identify multiple negative words within the electronic survey question; and based on identifying the multiple negative words, provide, by the one or more servers for presentation within an updated graphical user interface, a suggested revision rephrasing the electronic survey question.

9. The non-transitory computer readable storage medium of claim 8, wherein the user input entered within the electronic survey template comprises input composing the electronic survey question within the electronic survey template or input importing the electronic survey question into the electronic survey template.

10. The non-transitory computer readable storage medium of claim 8, wherein the suggested revision rephrasing the electronic survey question removes a negative word of the multiple negative words from the electronic survey question.

11. The non-transitory computer readable storage medium of claim 8, wherein the suggested revision rephrasing the electronic survey question changes a negative word of the multiple negative words to a positive word within the electronic survey question.

12. The non-transitory computer readable storage medium of claim 8, wherein applying the natural language processing to the electronic survey question to identify multiple negative words comprises detecting one or more negative prefixes within the electronic survey question.

13. The non-transitory computer readable storage medium of claim 10, further comprising instructions that, when executed by the at least one processor, cause the computer device to provide, to the administrator client device for presentation within the updated graphical user interface, a selectable option to accept the suggested revision rephrasing the electronic survey question.

14. The non-transitory computer readable storage medium of claim 10, further comprising instructions that, when executed by the at least one processor, cause the computer device to provide, for presentation within the updated graphical user interface, a notification communicating that the electronic survey question is an unclear survey question.

15. A system comprising:
at least one processor; and
at least one non-transitory computer readable storage medium storing instructions that, when executed by the at least one processor, cause the system to:

provide, by one or more servers that support an electronic survey service, a graphical user interface for presentation on an administrator client device, the graphical user interface comprising an electronic survey template for creating one or more electronic surveys;

receive, at the one or more servers, an electronic survey question based on user input entered within the electronic survey template;

apply natural language processing to the electronic survey question to identify multiple negative words within the electronic survey question; and based on identifying the multiple negative words, provide, by the one or more servers for presentation within an updated graphical user interface, a suggested revision rephrasing the electronic survey question.

16. The system of claim 15, wherein the user input entered within the electronic survey template comprises input composing the electronic survey question within the electronic survey template or input importing the electronic survey question into the electronic survey template.

17. The system of claim 15, wherein the suggested revision rephrasing the electronic survey question removes a negative word of the multiple negative words from the electronic survey question.

18. The system of claim 15, wherein the suggested revision rephrasing the electronic survey question changes a negative word of the multiple negative words to a positive word within the electronic survey question.

19. The system of claim 15, wherein applying the natural language processing to the electronic survey question to identify multiple negative words comprises detecting one or more negative prefixes within the electronic survey question.

20. The system of claim 15, further comprising instructions that, when executed by the at least one processor, cause the system to provide, to the administrator client device for presentation within the updated graphical user interface, a selectable option to accept the suggested revision rephrasing the electronic survey question.

* * * * *